United States Patent
Yoneda

(10) Patent No.: US 11,745,595 B2
(45) Date of Patent: Sep. 5, 2023

(54) ELECTRIC VEHICLE AND METHOD OF CONTROLLING THE SAME ACCORDING TO A PLURALITY OF CONTROL MAPS DEFINING A DRIVING FORCE

(71) Applicant: Yamaha Hatsudoki Kabushiki Kaisha, Shizuoka-ken (JP)

(72) Inventor: Yuichi Yoneda, Shizuoka (JP)

(73) Assignee: YAMAHA HATSUDOKI KABUSHIKI KAISHA, Shizuoka-Ken (JP)

(*) Notice: Subject to any disclaimer, the term of this patent is extended or adjusted under 35 U.S.C. 154(b) by 375 days.

(21) Appl. No.: 15/976,816

(22) Filed: May 10, 2018

(65) Prior Publication Data
US 2018/0326867 A1 Nov. 15, 2018

(30) Foreign Application Priority Data
May 12, 2017 (JP) .................. 2017-095370

(51) Int. Cl.
*B60L 7/14* (2006.01)
*B60L 7/26* (2006.01)
(Continued)

(52) U.S. Cl.
CPC ........ *B60L 7/14* (2013.01); *B60L 7/26* (2013.01); *B60L 15/00* (2013.01);
(Continued)

(58) Field of Classification Search
CPC ........ B60L 15/00; B60L 15/2009; B60L 7/26; B60L 7/14; B60L 50/51; B60L 2240/12;
(Continued)

(56) References Cited

U.S. PATENT DOCUMENTS 5,839,533 A * 11/1998 Mikami ................ B60L 7/10
180/165
8,880,266 B2 11/2014 Matsuda
(Continued)

FOREIGN PATENT DOCUMENTS

DE 102016211478 A1 * 12/2017
EP 0876548 A1 11/1998
(Continued)

OTHER PUBLICATIONS

"Motorcycle Modeling for High-Performance Maneurvering", Hauser et al., Oct. 1, 2006, IEEE contorl Systems (Year: 2006).*
(Continued)

*Primary Examiner* — Jeffrey C Boomer
(74) *Attorney, Agent, or Firm* — HEA LAW PLLC

(57) ABSTRACT

A plurality of control maps respectively corresponding to a plurality of lever operation amounts are stored in a storage device. Each control map defines a driving force to be output from an electric motor such that the driving force corresponds to an accelerator operation amount and a vehicle speed. A control device uses a control map corresponding to an actual lever operation amount among the plurality of control maps and thereby calculates the driving force to be output from the electric motor based on an actual accelerator operation amount and an actual vehicle speed from the control map. This vehicle can alleviate discomfort caused when a driver accustomed to an engine vehicle operates an electric vehicle.

23 Claims, 15 Drawing Sheets

(51) Int. Cl.
  *B60L 15/20* (2006.01)
  *B60L 50/51* (2019.01)
  *B60L 15/00* (2006.01)

(52) U.S. Cl.
  CPC .......... *B60L 15/2009* (2013.01); *B60L 50/51* (2019.02); *B60L 2200/12* (2013.01); *B60L 2240/12* (2013.01); *B60L 2240/423* (2013.01); *B60L 2250/24* (2013.01)

(58) Field of Classification Search
  CPC .......... B60L 2240/423; B60L 2200/12; B60L 2250/24; B62K 23/04; B62K 11/04; B62K 2204/00; B62J 43/00; B62J 43/16; B62J 43/30; Y02T 10/70; Y02T 10/64; Y02T 10/72
  See application file for complete search history.

(56) References Cited

U.S. PATENT DOCUMENTS

| | | | |
|---|---|---|---|
| 8,892,292 | B2 | 11/2014 | Matsuda |
| 9,096,132 | B2 | 8/2015 | Matsuda |
| 2002/0108798 | A1 | 8/2002 | Huntsberger et al. |
| 2004/0014564 | A1* | 1/2004 | Jager .................... B60W 10/02 477/115 |
| 2007/0032338 | A1* | 2/2007 | Damiani ......... B60W 30/18181 477/92 |
| 2008/0060861 | A1* | 3/2008 | Baur ....................... B60K 1/00 180/65.6 |
| 2010/0045224 | A1 | 2/2010 | Suhama et al. |
| 2011/0202222 | A1* | 8/2011 | Yamamoto ........... B60W 20/00 701/22 |
| 2011/0307130 | A1* | 12/2011 | Gow .................. B60G 17/0195 701/22 |
| 2012/0083958 | A1* | 4/2012 | Ballard ................. B60W 50/10 701/56 |
| 2013/0225362 | A1* | 8/2013 | Sato ...................... B60W 20/30 477/3 |
| 2013/0275023 | A1 | 10/2013 | Gregg et al. |
| 2014/0200777 | A1* | 7/2014 | Dufford ................ B60W 20/30 701/54 |
| 2015/0266491 | A1* | 9/2015 | Bergweiler ......... F02D 41/2422 701/99 |
| 2015/0274020 | A1* | 10/2015 | Matsuda ................ B60L 50/51 701/70 |
| 2016/0144850 | A1* | 5/2016 | Debert .................. B60W 10/08 180/65.265 |

FOREIGN PATENT DOCUMENTS

| | | | |
|---|---|---|---|
| JP | 2002369317 | * | 12/2002 |
| JP | 2009078576 A | * | 4/2009 |
| JP | 5478738 B2 | | 4/2014 |
| JP | 5478739 B2 | | 4/2014 |
| JP | 5695672 B2 | | 4/2015 |
| WO | 2011/143165 A1 | | 11/2011 |
| WO | 2012/090251 A1 | | 7/2012 |

OTHER PUBLICATIONS

Search Report dated Jun. 26, 2018, for corresponding EP Patent Application No. 18171379.3.

* cited by examiner

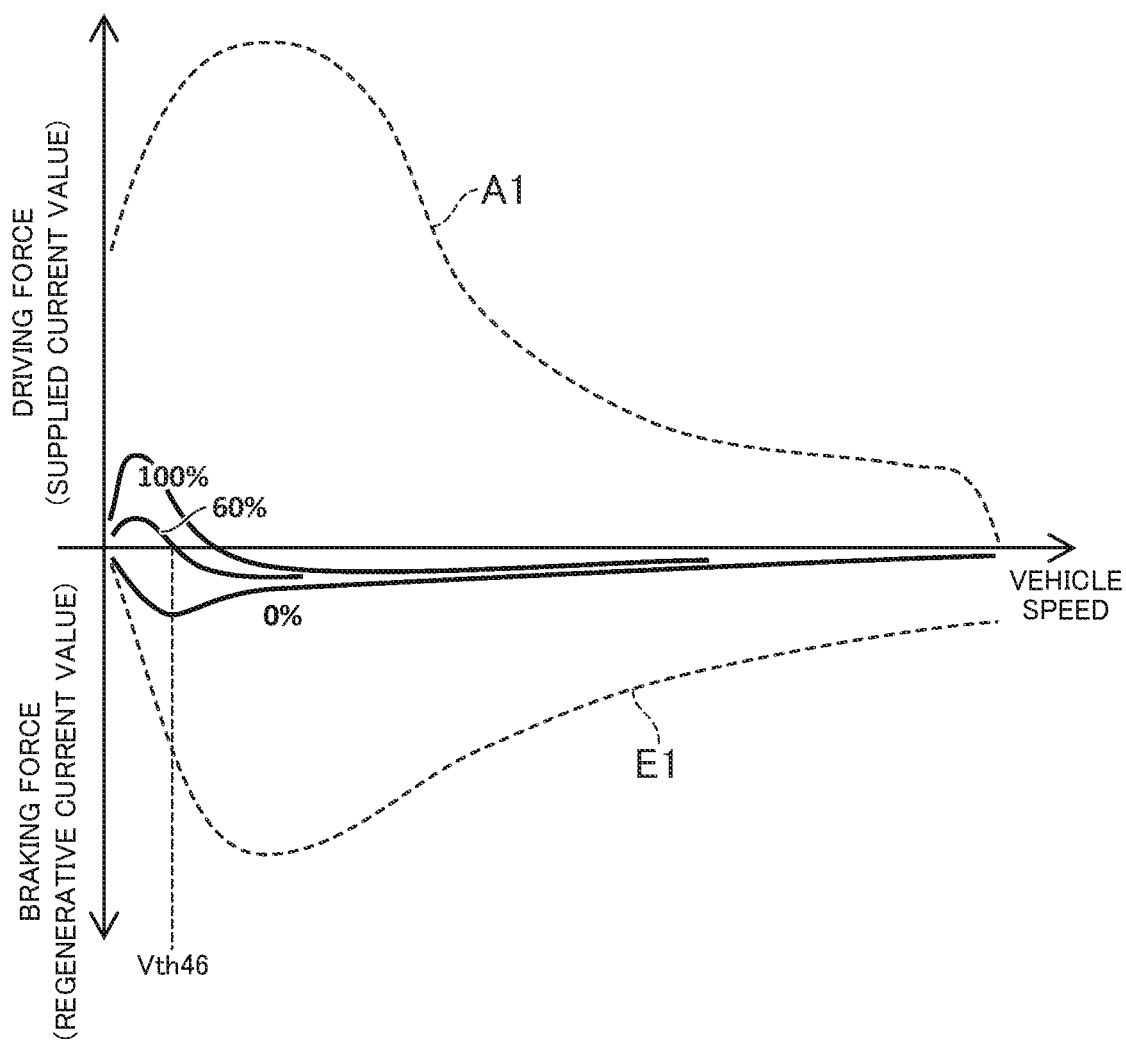

ELECTRIC VEHICLE AND METHOD OF CONTROLLING THE SAME ACCORDING TO A PLURALITY OF CONTROL MAPS DEFINING A DRIVING FORCE

CROSS-REFERENCE TO RELATED APPLICATION

The present application claims priority from Japanese application JP2017-095370 filed on May 12, 2017, the content of which is hereby incorporated by reference into this application.

BACKGROUND OF THE INVENTION

Field of the Invention

The present invention relates to control of an electric motor in an electric vehicle.

Description of the Related Art

Electric vehicles which have an electric motor as a drive source have been developed. In electric two-wheeled vehicles, output torque of an electric motor is controlled to correspond to an amount of rotation, for example, of an accelerator grip. An electric two-wheeled vehicle of International Publication WO2012/090251A1 (hereinafter referred to as Patent Document 1) includes an adjustment lever that enables fine adjustment of output torque of the electric motor, in addition to an accelerator grip. In the vehicle of Patent Document 1, when the adjustment lever is operated, the output torque of the electric motor is reduced at a rate in accordance with the operation amount thereof.

Motorcycles driven by an internal combustion engine (hereinafter referred to as engine vehicles) may each include a clutch lever. If a behavior of the electric vehicle due to the operation of the adjustment lever and a behavior of the engine vehicle due to the operation of the clutch lever have a large difference therebetween, a driver who is accustomed to engine vehicles may feel discomfort when the driver operates the adjustment lever of the electric vehicle. It is difficult for the motorcycle/vehicle of Patent Document 1 to alleviate such discomfort, since the adjustment of the lever controls the torque of the electric motor, which is reduced at a rate in accordance with the operation amount of the adjustment lever.

SUMMARY OF THE INVENTION

One of the purposes of the present disclosure is to provide an electric vehicle that can alleviate discomfort caused when a driver accustomed to an engine vehicle operates an electric vehicle.

(1) An electric vehicle according to an embodiment of the present invention comprises an electric motor that drives the vehicle; a first operation member that receives an operation from a driver; a second operation member that receives an operation from the driver; a storage device; and a control device. The storage device has a plurality of maps stored therein that respectively correspond to a plurality of operation amounts of the second operation member, where each map defines a driving force to be output from the electric motor, such that the driving force corresponds to a vehicle speed and an accelerator operation amount, which is an operation amount of the first operation member. The control device refers to a map, among the plurality of maps, that corresponds to an operation amount of the second operation member detected through a sensor and thereby calculates a driving force to be output from the electric motor based on a vehicle speed and an accelerator operation amount, detected through sensors. The electric vehicle is able to alleviate discomfort caused when a driver accustomed to an engine vehicle operates an electric vehicle.

(2) In the electric vehicle of part (1), the plurality of maps include a first map corresponding to a first operation amount of the second operation member and a second map corresponding to a second operation amount of the second operation member, and the second operation amount is larger than the first operation amount. The driving force defined by the second map may be smaller than the driving force defined by the first map. This makes a change in the driving force due to a change in the accelerator operation amount decrease and enables the vehicle to be easily stabilized when the vehicle running with the second operating member operated.

(3) In the electric vehicle of part (1), the plurality of maps may include a first map corresponding to a first operation amount of the second operation member and a second map corresponding to a second operation amount of the second operation member, and the second operation amount may be larger than the first operation amount. The driving force defined by the second map may be larger than the driving force defined by the first map in a partial region of vehicle speed when the first map and the second map are compared at the same accelerator operation amount. This electric vehicle can more effectively reduce driver discomfort when operated.

(4) In the electric vehicle of part (1), the plurality of maps may include a first map corresponding to a first operation amount of the second operation member and a second map corresponding to a second operation amount of the second operation member, and the second operation amount may be larger than the first operation amount. A rate of decrease in the driving force due to increase in the vehicle speed in the second map may be larger than a rate of decrease in the driving force due to increase in the vehicle speed in the first map.

(5) In the electric vehicle of part (1), the control device may calculate a driving force larger than 0 when the operation amount of the second operation member is a maximum. This vehicle enables the driver to notice driving of the electric motor when the first operation member is operated in a state where the second operation member is operated at its maximum.

(6) In the electric vehicle of part (5), the plurality of maps may include a map corresponding to a maximum operation amount of the second operation member, and the map corresponding to the maximum operation amount of the second operation member may define the driving force larger than 0. This vehicle enables the driver to notice driving of the electric motor when the first operation member is operated in a state where the second operation member is operated at its maximum.

(7) In the electric vehicle of part (1), the plurality of maps may include a first map corresponding to a first operation amount of the second operation member and a second map corresponding to a second operation amount of the second operation member, and the second operation amount may be larger than the first operation amount. The control device may perform a complementing process that calculates a driving force between a driving force calculated from the first map based on the operation amount of the first operation member and a driving force calculated from the second map based on the operation amount of the first operation member in a case where the operation amount of the second operation member is between the first operation amount and the second operation amount. This vehicle allows the driving force to continuously change due to operation of the second operation member.

(8) In the electric vehicle of part (1), the control device may select the map corresponding to the operation amount of the second operation member detected through the sensor among the plurality of maps.

(9) In the electric vehicle of part (1), at least three maps may be stored as the plurality of maps in the storage device.

(10) In the electric vehicle of part (1), at least one map may define a braking force to be obtained by electric power generation of the electric motor such that the braking force corresponds to the accelerator operation amount and the vehicle speed, and the control device may refers to a map, among the plurality of maps and the at least one map, corresponding to the operation amount of the second operation member detected through the sensor and thereby calculates the driving force or the braking force based on the vehicle speed and the accelerator operation amount detected through the sensors. This vehicle enables the braking force to be obtained by the electric power generation of the electric motor.

(11) In the electric vehicle of part (10), the force defined by the plurality of maps and the at least one map may change from the driving force to the braking force at a predetermined vehicle speed.

(12) In the electric vehicle of part (10), the braking force calculated by the control device may decreases in accordance with an increase in the operation amount of the second operation member, and the control device calculates a braking force larger than 0 when the operation amount of the second operation member is at a maximum.

(13) In the electric vehicle of part (12), the at least one map may correspond to a maximum operation amount of the second operation member, and defines the braking force larger than 0.

(14) In the electric vehicle of part (1), at least one of the plurality of maps defines the driving force for a partial region of the operating region such that the driving force corresponds to the accelerator operation amount and the vehicle speed, and defines a braking force for another partial region of the operating region such that the braking force corresponds to the accelerator operation amount and the vehicle speed. This vehicle enables the braking force to be obtained by the electric power generation of the electric motor.

(15) In the electric vehicle of part (11), the force defined by the plurality of maps and the at least one map may change from the driving force to the braking force at a predetermined vehicle speed. The predetermined vehicle speed may decrease in accordance with an increase in the operation amount of the second operation member.

(16) In the electric vehicle of part (10), the control device may calculate a braking force larger than 0 in a case where the accelerator operation amount is at a maximum and the operation amount of the second operation member is at a maximum.

Other objects and features of this invention will be in part apparent and in part point pointed out hereinafter.

BRIEF DESCRIPTION OF THE DRAWINGS

The following drawings illustrate examples of various components of the invention disclosed herein, and are for illustrative purposes only.

FIG. 7D is a graph illustrating another example of a control map.

DETAILED DESCRIPTION OF THE INVENTION

The present invention will now be described by referencing the appended figures representing embodiments. The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

In the present disclosure, an electric two-wheeled vehicle will be described as an example of an electric vehicle. The present invention may be applied to an electric four-wheeled vehicle or an electric three-wheeled vehicle. In addition, the present invention may be applied to a snowmobile.

Figure 1:
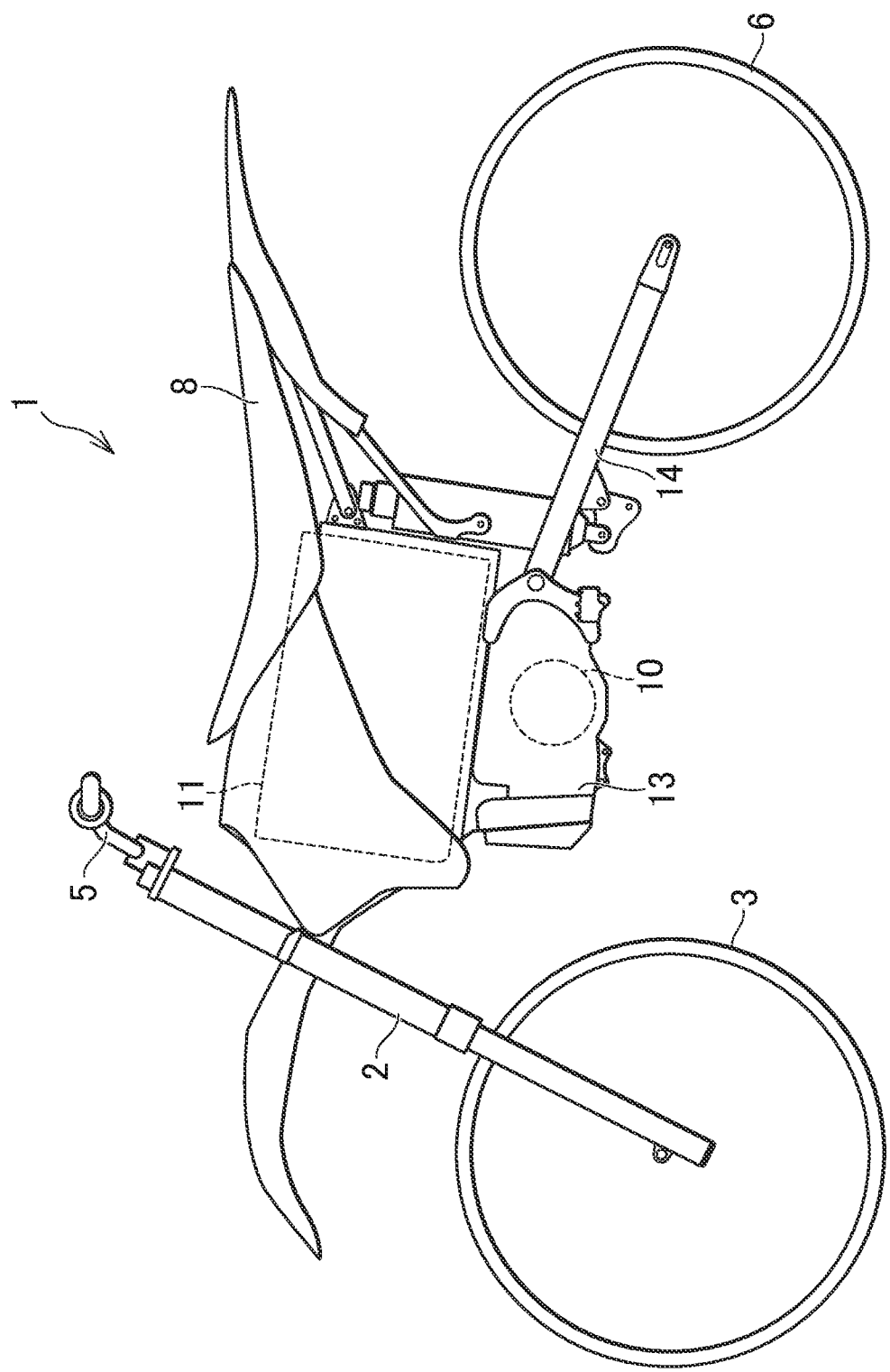
FIG. 1 is a side view illustrating an example of an electric vehicle proposed in the present disclosure. In this view, an electric two-wheeled vehicle is illustrated as an example of the electric vehicle.

As illustrated in FIG. 1, an electric two-wheeled vehicle 1 has a front wheel 3 operating as a steered wheel and a rear wheel 6 operating as a drive wheel. An axle of the front wheel 3 is supported at a lower end of a front fork 2. A steering handle bar 5 is fixed to an upper portion of the front fork 2. A seat 8 is disposed behind the steering handle bar 5.

In addition, the electric two-wheeled vehicle 1 has an electric motor 10 for driving the vehicle, and a battery 11 that stores electric power to be supplied to the electric motor 10. The electric motor 10 is connected to the rear wheel 6 via a power transmission path including a gear, a chain, or the like. As will be described later, during deceleration of the vehicle 1, the electric motor 10 works as a generator that generates electric power by receiving a rotational energy (power) of the rear wheel 6 through the power transmission path. The electric power to be output from the electric motor 10 is used for charging the battery 11 and/or is used for driving other electric components (for example, a headlight (not illustrated)) included in the electric two-wheeled vehicle 1. That is, the electric two-wheeled vehicle 1 performs braking control (regenerative control) during deceleration. In the present disclosure, "regeneration" includes not only a supply of electric power obtained by electric power generation of the electric motor 10 to the battery 11, but also a supply to other electric components.

In the example of the electric two-wheeled vehicle 1, the battery 11 is located below the front portion of the seat 8, and the electric motor 10 is located below the battery 11. The electric motor 10 is housed in a motor case 13. The rear wheel 6 is located behind the motor case 13 and the axle of the rear wheel 6 is supported by a swing arm 14 extending rearward from the motor case 13. The arrangement of the battery 11 and the electric motor 10 is not limited to the example of the electric two-wheeled vehicle 1, and may be appropriately changed.

[System Configuration]

Figure 2:
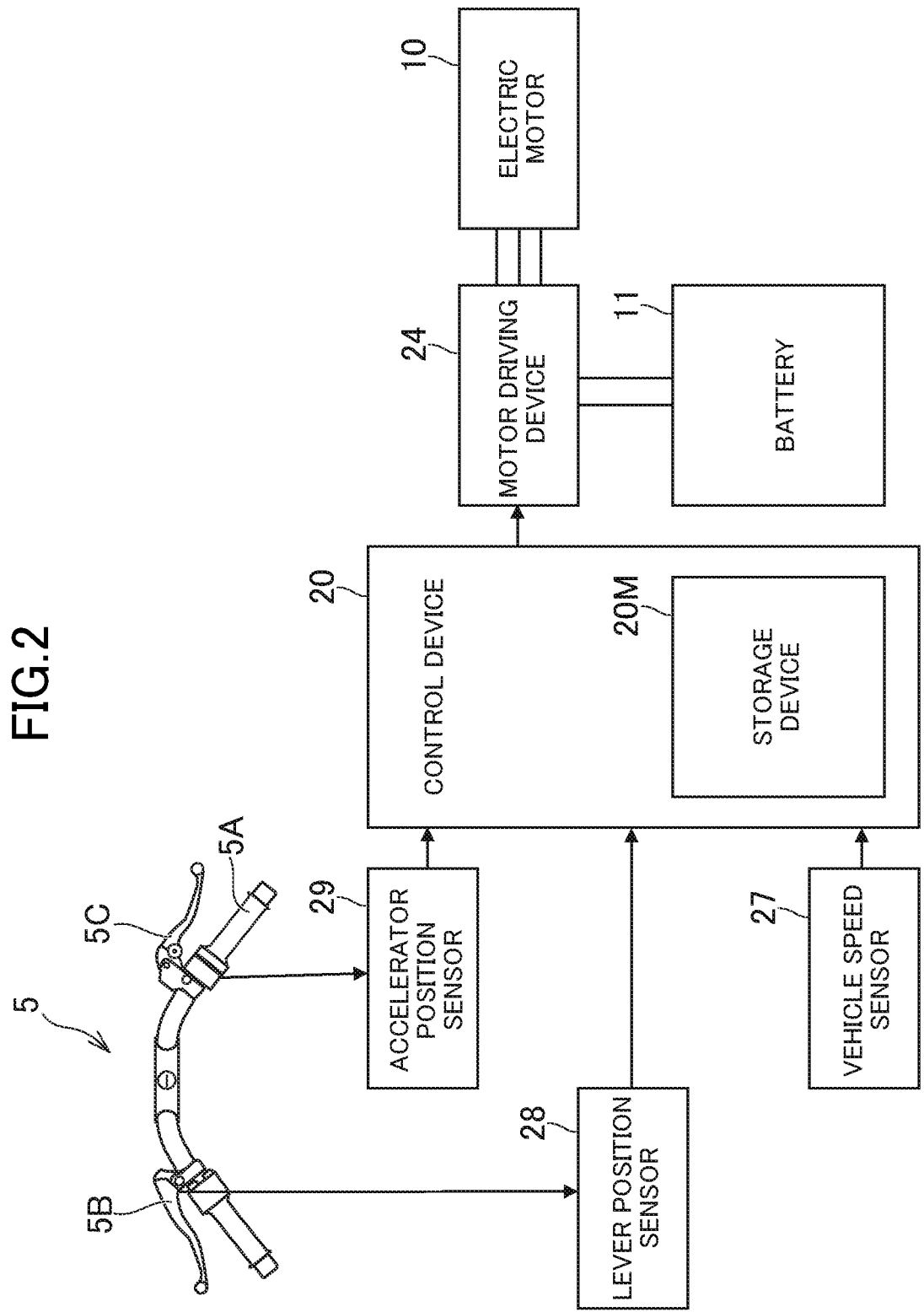
FIG. 2 is a block diagram illustrating a system included in the electric two-wheeled vehicle illustrated in FIG. 1.

The electric two-wheeled vehicle 1 has a first operation member and a second operation member as operation members for controlling the output (driving force) of the electric motor 10 in response to a driver's operation. In the example of the electric two-wheeled vehicle 1, as illustrated in FIG. 2, an accelerator grip 5A is provided on the steering handle bar 5 as the first operation member, and an operation lever 5B is provided on the steering handle bar 5 as the second operation member. The first operation member is not limited to the accelerator grip. For example, the first operation member may be an accelerator lever, a thumb accelerator member (operation member that can be pushed by a thumb), an accelerator pedal, or the like. The operation lever 5B is provided on the side opposite to the accelerator grip 5A. The second operation member may be a button, a rotatable grip, a foot lever which a rider can be operate with their legs, or the like. The steering handle bar 5 is provided with a brake lever 5C.

The electric two-wheeled vehicle 1 has an accelerator position sensor 29 for detecting an operation amount (e.g. rotational position) of the accelerator grip 5A and a lever position sensor 28 for detecting operation amount (e.g. position) of the operation lever 5B. In addition, the electric two-wheeled vehicle 1 includes a vehicle speed sensor 27 for detecting vehicle speed. The mounting position of the vehicle speed sensor 27 can be appropriately selected. That is, the vehicle speed sensor 27 may be provided so as to output a signal corresponding to a rotation of the front wheel 3, or may be provided so as to output a signal corresponding to a rotation of the rear wheel 6. In addition, the vehicle speed sensor 27 may be provided so as to output a signal corresponding to a rotation of a gear constituting the power transmission path provided between the electric motor 10 and the rear wheel 6.

As illustrated in FIG. 2, the electric two-wheeled vehicle 1 has a control device 20. The control device 20 includes a storage device 20M including a read only memory (ROM), a random access memory (RAM), and the like, or a central processing unit (CPU (not illustrated)) that executes a program stored in the storage device 20M. Signals from the above-described sensors 29, 28, and 27 are converted into digital signals and then input to the CPU. The control device 20 calculates vehicle speed based on the signal from the vehicle speed sensor 27. The control device 20 controls the electric motor 10 based on the signals from the sensors 29, 28, and 27. The control performed by the control device 20 will be described later in detail.

A motor driving device 24 uses electric power stored in the battery 11 to supply, to the electric motor 10, the electric power corresponding to a command value input from the control device 20. The electric motor 10 is, for example, a three-phase AC motor. The motor driving device 24 includes an inverter that converts a direct current supplied from the battery 11 into an alternating current, and supplies the alternating current to the electric motor 10. During deceleration of the vehicle (when braking control, described later, is performed), the motor driving device 24 supplies electric power corresponding to a command value received from the control device 20 to the battery 11 and the electric components of the electric two-wheeled vehicle 1, by electric power generation of the electric motor 10. The motor driving device 24 includes a converter that converts an alternating current obtained from the electric motor 10 into a direct current, and supplies the direct current to the battery 11 and/or the electric component of the electric two-wheeled vehicle 1 or the like during deceleration of the vehicle.

[Control of Electric Motor]

The storage device 20M has a control map stored therein that defines a driving force to be output from the electric motor 10 such that the driving force corresponds to an operation amount of the accelerator grip 5A and vehicle speed. Hereinafter, operation amount of accelerator grip 5A is referred to as "accelerator operation amount". The control device 20 calculates a driving force to be output from the electric motor 10 by referring to the control map, based on an accelerator operation amount detected through the accelerator position sensor 29 and a vehicle speed detected through the vehicle speed sensor 27. The control device 20 outputs a command value corresponding to the calculated driving force to the motor driving device 24, and then the motor driving device 24 supplies electric power corresponding to the command value to the electric motor 10. The "vehicle speed" may be a speed itself of the vehicle 1 and may be a speed corresponding to the speed of the vehicle 1 (for example, rotational speed of front wheel 3, rotational speed of rear wheel 6, rotational speed of electric motor 10, and rotational speed of a gear in a power transmission path from electric motor 10 to rear wheel 6). Hereinafter, the accelerator operation amount detected through the accelerator position sensor 29 is referred to as an "actual accelerator operation amount", and the vehicle speed detected through the vehicle speed sensor 27 is referred to as an "actual vehicle speed". The accelerator operation amount varies between 0% and 100%.

Figure 3A:
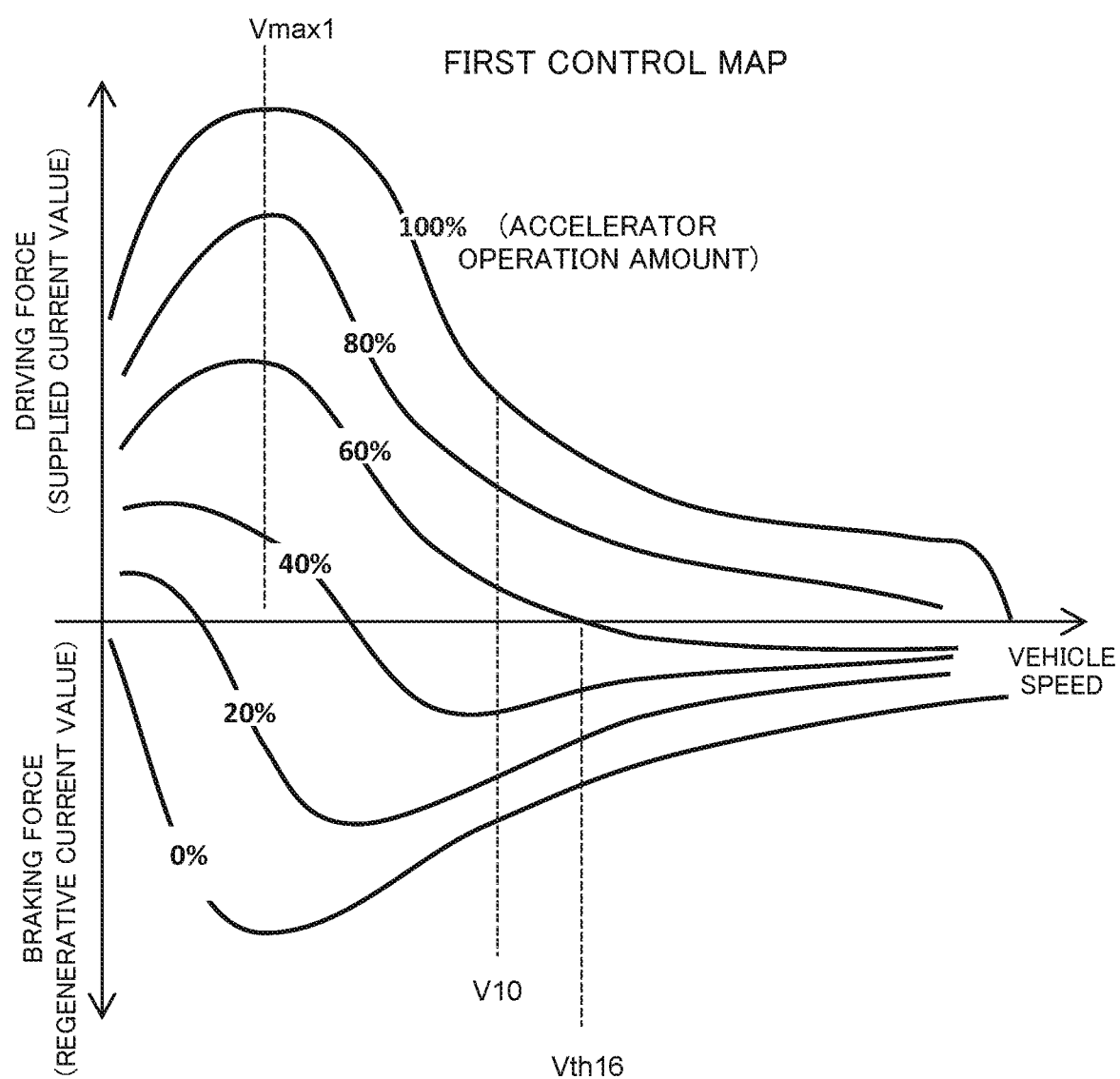
FIG. 3A is a graph illustrating an example of a first control map stored in a storage device illustrated in FIG. 2.
Figure 3B:
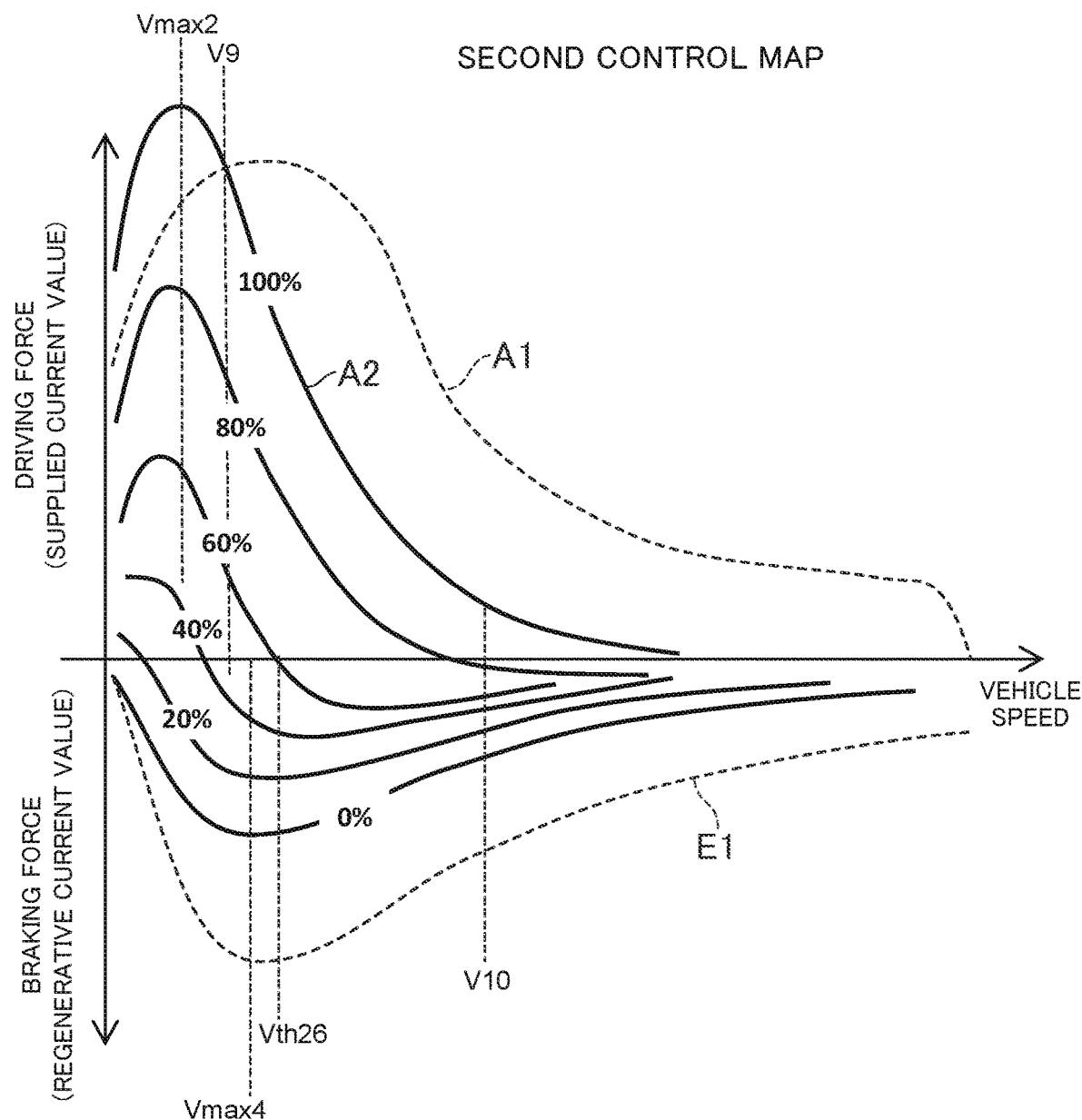
FIG. 3B is a graph illustrating an example of a second control map stored in the storage device illustrated in FIG. 2.
Figure 3C:
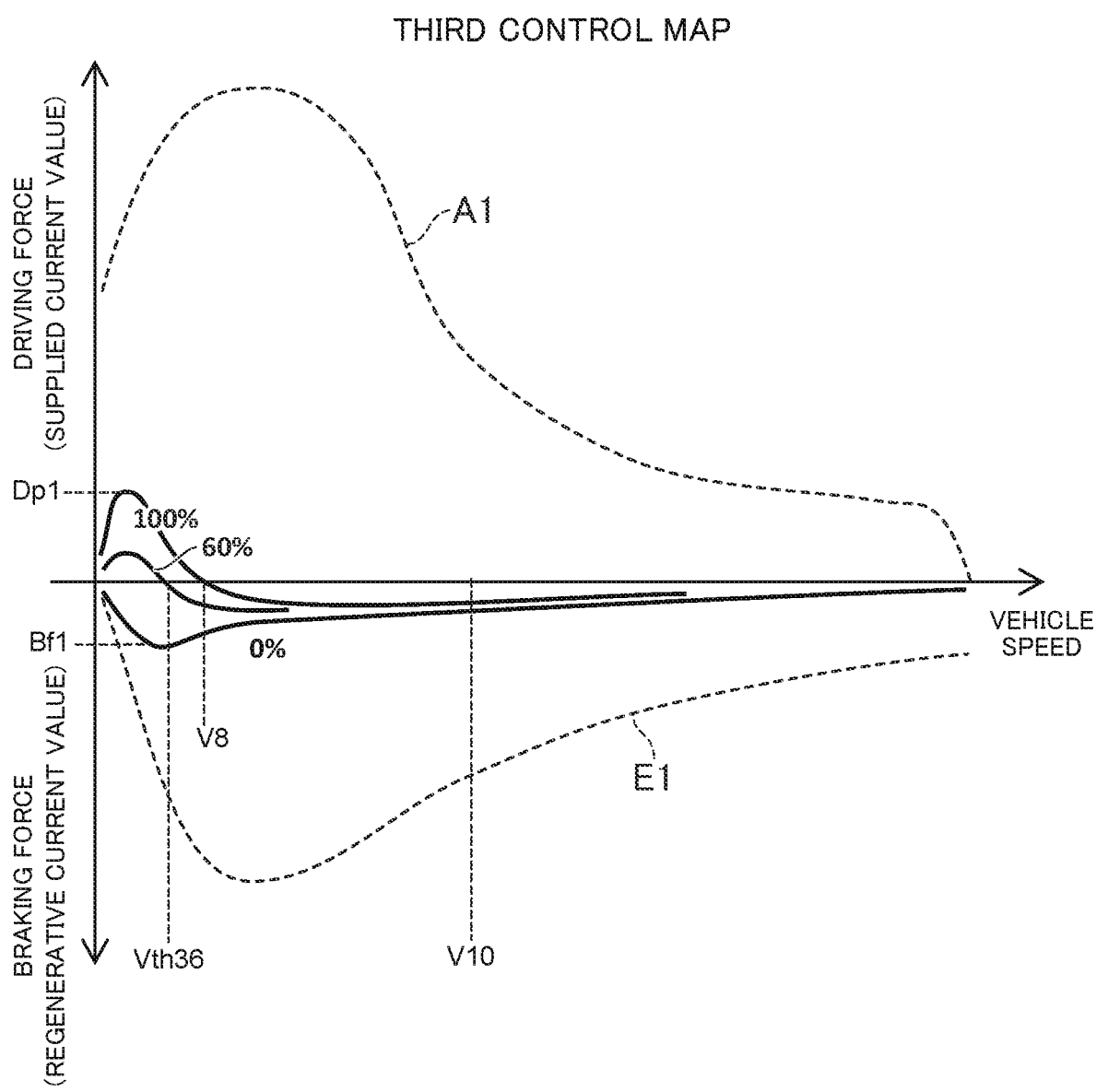
FIG. 3C is a graph illustrating an example of a third control map stored in the storage device illustrated in FIG. 2.

The storage device 20M stores a plurality of control maps. The plurality of control maps respectively correspond to a plurality of operation amounts of the operation lever 5B. Hereinafter, an operation amount of operation lever 5B is referred to as a "lever operation amount", and the lever operation amount varies between 0% and 100%. As illustrated in FIGS. 3A to 3C, for example, three control maps are stored in the storage device 20M. Hereinafter, the control maps illustrated in FIGS. 3A, 3B, and 3C are referred to as a first control map, a second control map, and a third control map, respectively. The lever operation amount corresponding to the second control map (hereinafter, referred to as a second lever operation amount) is larger than the lever operation amount corresponding to the first control map (hereinafter, referred to as a first lever operation amount). In addition, the lever operation amount corresponding to the third control map (hereinafter, referred to as a third lever operation amount) is larger than the second lever operation amount. For example, the first, second, and third lever operation amounts are 0%, 50%, and 100%, respectively. That is, the first control map corresponds to the minimum lever operation amount, and the third control map corresponds to the maximum lever operation amount. The lever operation amount corresponding to the three control maps is not limited thereto. For example, the first lever operation amount may be a value (for example, 10%) larger than the minimum value (0%) of the operation amount. In addition, the third lever operation amount may be a value (for example, 90%) smaller than the maximum value (100%) of the operation amount. In addition, the number of control maps may be more than three, or may be two. Each control map defines a driving force to be output from the electric motor 10 corresponding to the accelerator operation amount and the vehicle speed.

The control device 20 uses a control map, among the plurality of control maps, corresponding to a lever operation amount detected through the lever position sensor 28. The control device 20 refers to the control map and thereby calculates a driving force to be output from the electric motor 10 based on the actual accelerator operation amount and the actual vehicle speed. For example, when a lever operation amount detected through the lever position sensor 28 is 50%, the control device 20 refers to a control map (for example, the second control map illustrated in FIG. 3B) provided for the lever operation amount of 50%, to calculate a driving force corresponding to the actual accelerator operation amount and the actual vehicle speed. Hereinafter, the lever operation amount detected through the lever position sensor 28 is referred to as an "actual lever operation amount".

Specifically, the driving force is a torque output from the electric motor 10. A torque of the electric motor corresponds to a current value of electric power to be supplied to the electric motor. That is, the torque to be output from the electric motor increases in accordance with an increase in the current value. Therefore, in the example of the electric two-wheeled vehicle 1, each control map defines a current value of the electric power to be supplied to the electric motor 10 as a driving force output from the electric motor 10. Hereinafter, current value will be referred to as a "supplied current value". The control device 20 calculates a supplied current value corresponding to an actual accelerator operation amount and an actual vehicle speed by referring to the control map, and outputs a command value corresponding to the calculated supplied current value to the motor driving device 24.

As illustrated in FIGS. 3A to 3C, in the example of the electric two-wheeled vehicle 1, each control map defines a braking force to be obtained by electric power generation of the electric motor 10 such that the braking force corresponds to an accelerator operation amount and a vehicle speed. That is, each control map defines a driving force to be output from the electric motor 10 for a partial region of an operating region of the electric motor 10 such that the driving force corresponds to an accelerator operation amount and a vehicle speed and defines a braking force to be obtained by the electric power generation of the electric motor 10 for another partial region of the operating region such that the braking force corresponds to the accelerator operation amount and the vehicle speed. Hereinafter, the partial region of the operation region where the driving force obtained from the electric motor 10 is defined is referred to as a "driving operating region". Further, the partial region where the braking force obtained from the electric motor 10 is defined is referred to as a "braking operating region". The control maps illustrated in FIGS. 3A to 3C will be described later in detail.

When the driving state of the vehicle is in the braking operating region, the control device 20 refers to a control map corresponding to the actual lever operation amount and calculates, by referring the control map, the braking force to be obtained by the electric power generation of the electric motor 10 based on the actual accelerator operation amount and the actual vehicle speed. The control device 20 outputs a command value corresponding to the calculated braking force to the motor driving device 24, and the motor driving device 24 regenerates electric power corresponding to the command value. That is, the motor driving device 24 supplies electric power corresponding to the command value from the electric motor 10 to the electric components such as the battery 11 and the headlight, by electric power generation of the electric motor 10.

Normally, braking force obtained from the electric motor corresponds to a current value of the electric power generated by an electric motor (e.g. electric power to be supplied to electric components such as battery 11). That is, when the current value increases, the braking force obtained from the electric motor increases. Therefore, in the example of the electric two-wheeled vehicle 1, each control map defines, as the braking force, the current value of electric power to be supplied from the electric motor 10 to the battery 11 and the like by electric power generation of the electric motor 10. Hereinafter, current value is referred to as a "regenerative current value". When the driving state of the vehicle is in the braking operating region, the control device 20 calculates a regenerative current value corresponding to the actual accelerator operation amount and the actual vehicle speed by referring to the control map, and outputs a command value corresponding to the calculated regenerative current value to the motor driving device 24.

As described above, the electric two-wheeled vehicle 1 has a plurality of control maps, so that the behavior of the vehicle, 1 when the operation lever 5B is operated, can be brought closer to a behavior of an engine vehicle when its clutch lever is operated. Hereinafter, functions of the control device 20 will be described in detail.

[Process Performed by Control Device]

Figure 4:
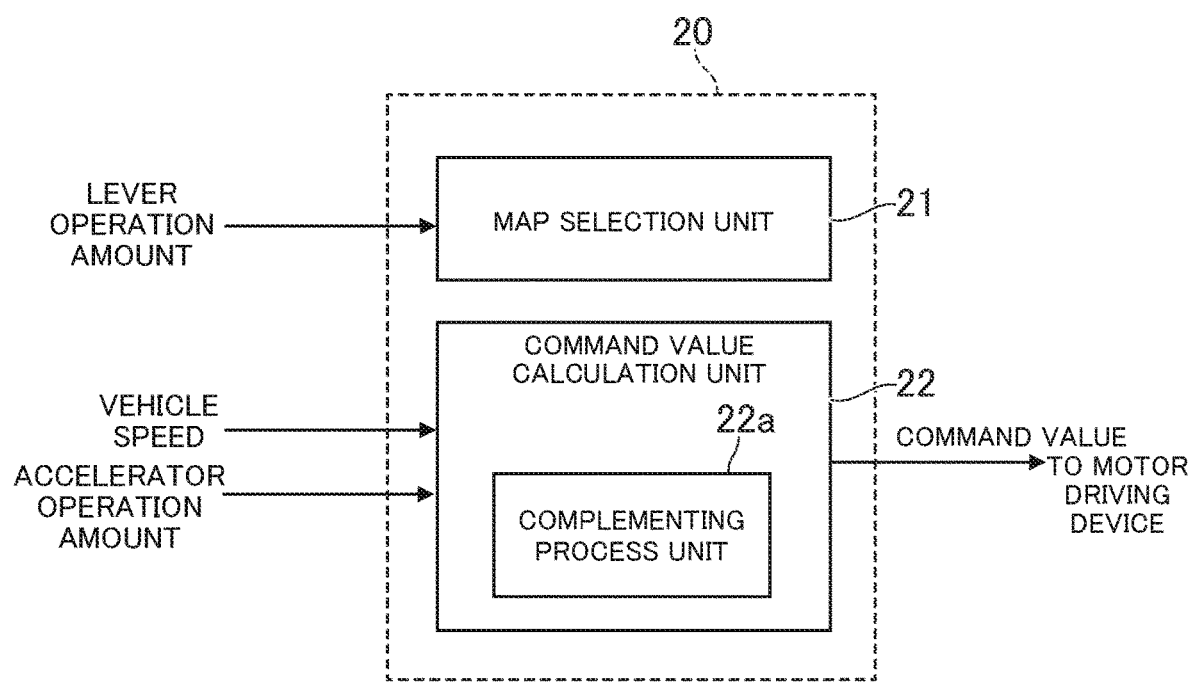
FIG. 4 is a block diagram illustrating a function of a control device illustrated in FIG. 2.

FIG. 4 is a block diagram illustrating the functions of the control device 20. As illustrated in the diagram, the control device 20 includes, as functions thereof, a map selection unit 21 and a command value calculation unit 22. The function of each portion is realized by the control device 20 executing the program stored in the storage device 20M.

As described above, the plurality of control maps corresponding to the plurality of lever operation amounts are stored in the storage device 20M. The map selection unit 21 selects a control map corresponding to the actual lever operation amount. For example, in a case where the actual lever operation amount coincides with the first lever operation amount, the map selection unit 21 selects the first control map (for example, FIG. 3A). As described above, the first lever operation amount may be a value larger than 0% (for example, 10%). When the actual lever operation amount is within the range from 0% to the first lever operation amount, the map selection unit 21 may select the first control map. This prevents the control maps from being changed from the first control map to the second control map when the operation amount of the operation lever 5B is only slightly and unintentionally changed by the rider. In addition, the third lever operation amount may be a value smaller than 100% (for example, 90%). When the actual lever operation amount is within the range from the third lever operation amount to 100%, the map selection unit 21 may select the third control map.

The map selection unit 21 may select two control maps for the complementing process to be described later. For example, in a case where the actual lever operation amount is between the first lever operation amount and the second lever operation amount, the map selection unit 21 may select the first control map and the second control map. In this case, the complementing process described later calculates a driving force (or braking force) between a driving force (or braking force) obtained from the first control map and a driving force (or braking force) obtained from the second control map.

The command value calculation unit 22 refers to the control map selected by the map selection unit 21. When the vehicle 1 is in the driving operating region, the command value calculation unit 22 calculates a current value (that is, a supplied current value) of an electric power to be supplied to the electric motor 10 based on the actual accelerator operation amount and the actual vehicle speed, and outputs a command value corresponding to the current value to the motor driving device 24. When the vehicle 1 is in the braking operating region, the command value calculation unit 22 calculates a current value (that is, a regenerative current value) of an electric power to be obtained by the electric power generation of the electric motor 10 based on the actual accelerator operation amount and the actual vehicle speed, and outputs a command value corresponding to the current value to the motor driving device 24.

As described above, the first control map (for example, FIG. 3A), the second control map (for example, FIG. 3B), and the third control map (for example, FIG. 3C) stored in the storage device 20M are provided for the first lever operation amount, the second lever operation amount, and the third lever operation amount, respectively. The command value calculation unit 22 includes a complementing process unit 22a that complements value between the driving forces (value between the braking forces, and value between the driving force and the braking force) defined by the plurality of control maps. That is, the complementing process unit 22a calculates a current value between the current values defined by the plurality of control maps.

For example, in a case where the actual lever operation amount is between the first lever operation amount and the second lever operation amount, the map selection unit 21 selects the first control map and the second control map. The command value calculation unit 22 calculates a current value (that is, a supplied current value or a regenerative current value) obtained from the first control map and a current value (a supplied current value or a regenerative current value) obtained from the second control map. The complementing process unit 22a calculates a current value between the two calculated current values as a command value based on the actual lever operation amount. For example, as the actual lever operation amount is closer to the first lever operation amount, the complementing process unit 22a calculates a command value closer to the current value obtained from the first control map. Conversely, as the actual lever operation amount is closer to the second lever operation amount, the complementing process unit 22a calculates a command value closer to the current value obtained from the second control map. That is, the complementing process unit 22a may proportionally divide the difference between the two current values based on the actual lever operation amount.

Similarly, when the actual lever operation amount is, for example, between the second lever operation amount and the third lever operation amount, the map selection unit 21 selects the second control map and the third control map. The command value calculation unit 22 calculates a current value (a supplied current value or a regenerative current value) obtained from the second control map and a current value (a supplied current value or a regenerative current value) obtained from the third control map. In this case, as the actual lever operation amount is closer to the second lever operation amount, the command value calculated by the complementing process unit 22a is closer to the current value obtained from the second control map. Conversely, as the actual lever operation amount is closer to the third lever operation amount, the command value calculated by the complementing process unit 22a is closer to the current value obtained from the third control map.

As described above, each control map defines, in the braking operating region, a braking force (in other words, regenerative current value) obtained by electric power generation of the electric motor 10. The above-described complementing process may work not only in a case where the vehicle is in the driving operating region but also in a case where the vehicle is in the braking operating region. For example, in a case where the actual lever operation amount is between the first lever operation amount and the second lever operation amount, the complementing process unit 22a may calculate the current value between the regenerative current value obtained from the first control map and the regenerative current value obtained from the second control map. In addition, the supplied current value may be calculated from one of the two control maps selected by the map selection unit 21, and the regenerative current value may be calculated from the other thereof. In this case, the complementing process unit 22a may calculate, as the command value, the current value between the supplied current value and the regenerative current value.

The complementing process unit 22a may not be necessarily used. For example, a range of values that the lever operation amount potentially takes, maybe divided into a plurality of partial ranges. The plurality of control maps may correspond to the plurality of partial ranges, respectively. For example, the first control map (for example, FIG. 3A) may correspond to a first range (for example, lever operation amount of 0% to 50%), the second control map (for example, FIG. 3B) may correspond to a second range (for example, lever operation amount of 51% to 99%), and the third control map may correspond to a lever operation amount of 100%. In this case, the map selection unit 21 selects one control map corresponding to the actual lever operation amount. The command value calculation unit 22 calculates the current value (a supplied current value or a regenerative current value) from the selected control map without performing the complementing process.

Figure 5:
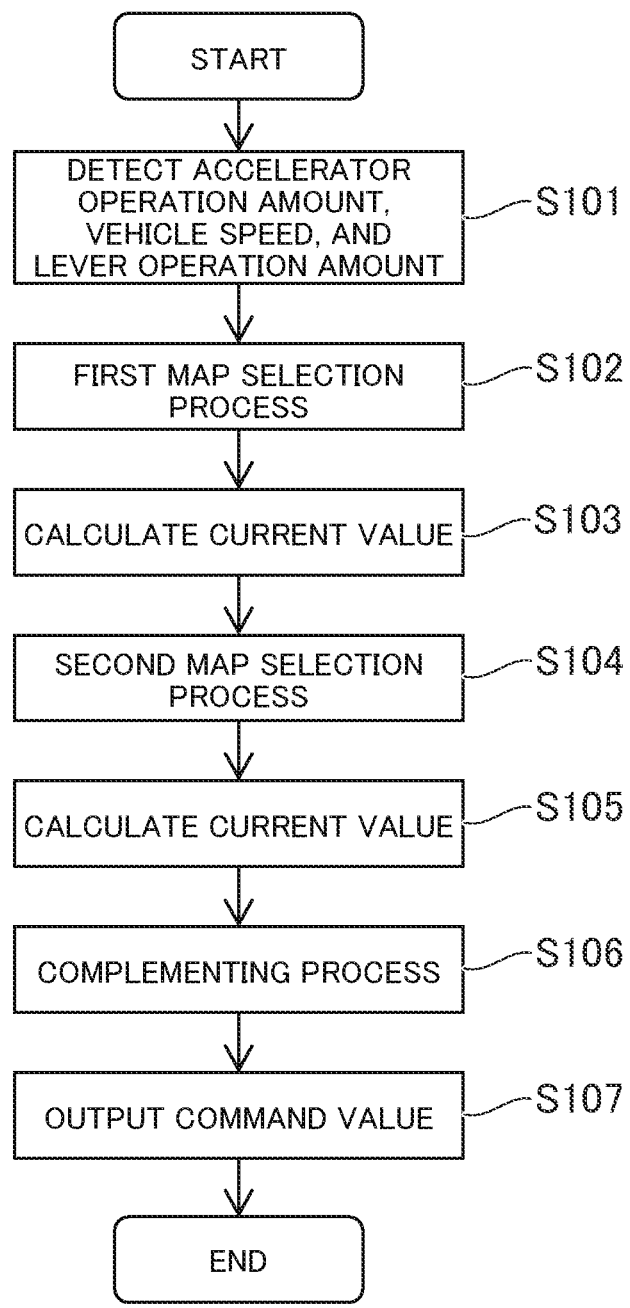
FIG. 5 is a flowchart illustrating an example of a process performed by the control device illustrated in FIG. 2.

FIG. 5 is a flowchart illustrating an example of a process performed by the control device 20. The process illustrated in FIG. 5 is repeatedly performed at a predetermined cycle while the vehicle is running.

First, the control device 20 detects an actual accelerator operation amount, an actual vehicle speed, and an actual lever operation amount based on the outputs of the sensors 29, 28, and 27 (S101). Next, the control device 20 (map selection unit 21) selects a control map corresponding to the actual lever operation amount from the plurality of control maps. For example, the control device 20 performs processes for selecting two maps (S102, S104).

In the first map selection process (S102), the control device 20 selects the control map under the following conditions, for example. (Hereinafter, Lact is the actual lever operation amount.)
 (1) Lact<second lever operation amount: first control map is selected
 (2) Second lever operation amount≤Lact<third lever operation amount: second control map is selected
 (3) Third lever operation amount≤Lact: third control map is selected The control device 20 (command value calculation unit 22) refers to the control map selected in the first map selection process and calculates a current value (supplied current value or regenerative current value) corresponding to the actual accelerator operation amount detected in S101 and the actual vehicle speed (S103). In other words, the control device 20 calculates the driving force to be output from the electric motor 10 or the braking force to be obtained by the electric power generation of the electric motor 10.

In the second map selection process (S104), the control device (map selection unit 21) selects the control map under the following conditions, for example.
 (4) Lact≤first lever operation amount: first control map is selected
 (5) First lever operation amount<Lact≤second lever operation amount: second control map is selected
 (6) Second lever operation amount<Lact: third control map is selected As described above, the first lever operation amount may be larger than 0% (for example, 10%). When the selection process of the control map according to the above conditions of (1) to (6) works, the first lever operation amount is larger than 0%, and the actual lever operation amount is within the range from 0% to the first lever operation amount (for example, 10%), the first control map is selected. In addition, the third lever operation amount may be a value (90%) smaller than 100%. When the selection process of the control map according to the above conditions (1) to (6) works, the third lever operation amount is smaller than 100%, and the actual lever operation amount is within the range from the third lever operation amount (for example, 90%) to 100%, the third control map is selected.

The control device 20 (command value calculation unit 22) calculates a current value (a supplied current value or a regenerative current value) corresponding to the actual accelerator operation amount and the actual vehicle speed detected in S101, by referring to the control map selected in the second map selection process (S105). In other words, the control device 20 calculates the driving force to be output from the electric motor 10 or the braking force to be obtained by the electric power generation of the electric motor 10.

The control device 20 (complementing process unit 22a) performs a complementing process using the current value calculated in S103 and the current value calculated in S105 (S106). More specifically, the control device 20 proportionally divides the difference between the current value calculated in S103 and the current value calculated in S105 by the actual lever operation amount. The control device 20 outputs the current value obtained by proportional division as a command value to the motor driving device 24 (S107).

According to the first map selection process (S102) and the second map selection process (S104), when the actual lever operation amount coincides with, for example, the first lever operation amount, the first control map is selected in both of the two map selection processes. Therefore, the current value obtained in S103 is the same as the current value obtained in S105, and the current value is output to the motor driving device 24 as a command value. Similarly, when the actual lever operation amount coincides with the second lever operation amount, the second control map is selected in both of the two map selection processes. In addition, when the actual lever operation amount coincides with the third lever operation amount, the third control map is selected in both of the two map selection processes.

The process of the control device 20 is not limited to the example illustrated in FIG. 5. For example, the control device 20 determines whether the actual lever operation amount coincides with the first lever operation amount, the second lever operation amount, or the third lever operation amount, and in a case where the actual lever operation amount coincides with the first lever operation amount, the second lever operation amount, or the third lever operation amount, only one control map corresponding to the actual lever operation amount may be selected. In this case, the complementing process may not be performed.

[Detailed Control Map]

Hereinafter, the control map stored in the storage device 20M will be described in detail. As described above, in the example of the electric two-wheeled vehicle 1, the first control map, the second control map, and the third control map are stored in the storage device 20M and exemplified in FIGS. 3A to 3C. The first control map, the second control map, and the third control map respectively correspond to a first lever operation amount Lv1, a second lever operation amount Lv2, and a third lever operation amount Lv3 (Lv1<Lv2<Lv3). Numerical values such as 100%, 80%, and the like in these figures indicate the accelerator operation amount. In addition, in FIGS. 3B and 3C, a broken line A1 is the driving force defined in the first control map for the accelerator operation amount of 100%, a broken line E1 is the braking force defined in the first control map for the accelerator operation amount of 0%.

In each control map, the driving force (in other words, supplied current value) of the electric motor 10 increases in accordance with an increase in the vehicle speed in an operating region where the vehicle speed is from 0 km/h to a predetermined speed, under a condition that the accelerator operation amount is constant. Hereinafter, this predetermined vehicle speed is referred to as a "maximum driving force speed". The driving force decreases in accordance with an increase in the vehicle speed in an operating region where the vehicle speed is higher than the maximum driving force speed. For example, referring to the second control map in FIG. 3B, the driving force increases in accordance with an increase in the vehicle speed in an operating region where the vehicle speed is up to the maximum driving force speed, Vmax 2, under a condition that the accelerator operation amount is 100%. In the operating region where the vehicle speed is higher than the maximum driving force speed Vmax 2, the driving force decreases in accordance with an increase in the vehicle speed. The other control maps are similar thereto. As illustrated in FIGS. 3A to 3C, such a maximum driving force speed is not defined for a low accelerator operation amount (for example, 0%).

The driving forces defined by the plurality of control maps decrease in accordance with increase in the lever operation amount. That is, in a case where the plurality of control maps are compared at the same operating point (that is, under a condition that accelerator operation amounts in the maps are the same and vehicle speeds in the maps are the same), the driving force (supplied current value) defined by the second control map is smaller than the driving force defined by the first control map. Further, in the same case, the driving force defined by the third control map is smaller than the driving force defined by the second control map. For example, when comparing the three control maps at the operating point of "accelerator operation amount of 100% and vehicle speed of V10", the driving force defined by the second control map is smaller than the driving force defined by the first control map (in this comparison, the "braking force" is regarded as a negative driving force). In addition, in the same comparison, the driving force defined by the third control map is smaller than the driving force defined by the second control map (in this comparison, the "braking force" is regarded as a negative driving force). As will be described later, in the example of the electric two-wheeled vehicle 1, the driving force defined by the second control map is larger than the driving force defined by the first control map in a low speed region.

As illustrated in FIGS. 3A and 3B, when the vehicle speed increases, the driving force (supplied current value) defined by the second control map decreases more rapidly than the driving force defined by the first control map. In other words, in comparing the two control maps for the same accelerator operation amount, a decrease in the driving force due to the increase in the vehicle speed defined by the second control map has a rate larger than that of the driving force defined by the first control map. Referring to FIGS. 3A and 3B, for example, for the accelerator operation amount of 100%, the decrease of the driving force defined by the second control map has a larger rate than that of the driving force defined by the first control map. The rate of decrease in the driving force defined by the second control map corresponds to a gradient of a line in FIG. 3B at vehicle speed Vmax 2 or more. The rate of decrease in the driving force defined by the first control map corresponds to a gradient of line in FIG. 3A at vehicle speed Vmax 1 or more. In the examples of FIGS. 3A and 3B, the same applies to other accelerator operation amounts such as 40%, 60%, and 80%.

Figure 6A:
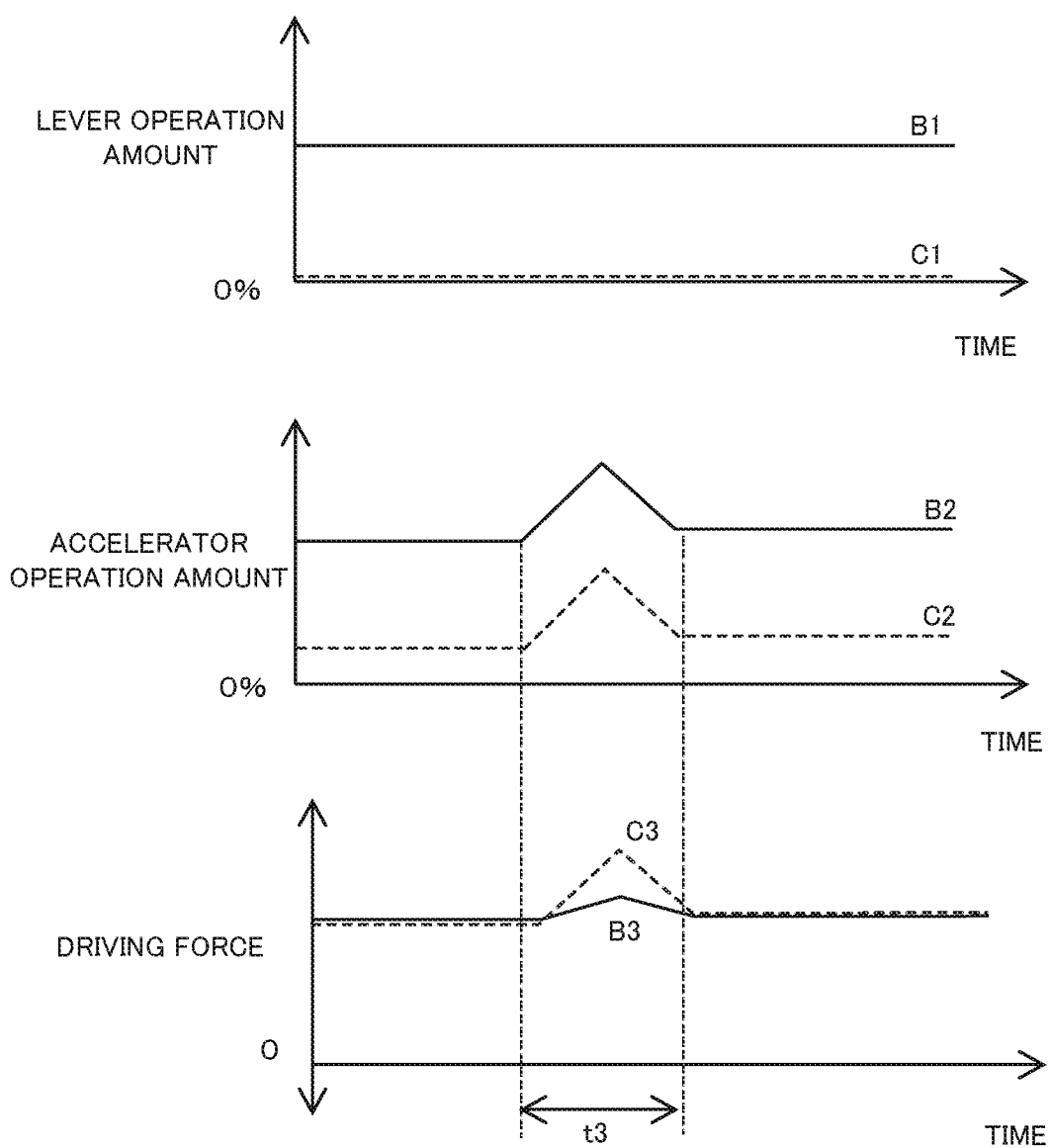
FIG. 6A is a graph illustrating an example of changes in accelerator operation amount, lever operation amount, and driving force over time.

As described above, the driving force defined by the plurality of control maps decreases as the lever operation amount increases. Therefore, in a state where the operation lever 5B is operated, the change in the driving force due to the change in the accelerator operation amount can be made smaller than that in a state where the operation lever 5B is not operated. FIG. 6A is a graph illustrating an example of temporal changes in the accelerator operation amount, the lever operation amount, and the driving force. In this figure, broken lines C1, C2, and C3 indicate changes in the state where the operation lever 5B is not operated, and solid lines B1, B2, B3 indicate changes in the state where the operation lever 5B is operated (for example, a lever operation amount of 60%). In the example of this figure, the accelerator operation amount has changed in a period t3. In the state where the operation lever 5B is not operated, the driving force changes in accordance with the change in the accelerator operation amount (refer to broken line C3). On the other hand, in the state where the operation lever 5B is operated, the change in the driving force is smaller than that in the state where the operation lever 5B is not operated (refer to solid line B3). Therefore, operating the operation lever 5B by the driver enables the driving force of the electric motor 10 to be easily stabilized, and as a result, low-speed running can be easily realized.

As described above, each control map defines the driving force to be output from the electric motor 10 in the driving operating region, and defines the braking force to be obtained by the electric power generation of the electric motor 10 in the braking operating region. Under a condition that the accelerator operation amount is constant, when the lever operation amount increases, the force (current value) defined by the control map changes from the driving force (supplied current value) to the braking force (regenerative current value). For example, for the accelerator operation amount of 80%, although a driving force (supplied current value) is defined in the entire region of vehicle speed in the first control map, a braking force (regenerative current value) is defined in a high-speed region in the second control map. Therefore, when the lever operation amount is increased, the control of the control device 20 is switched from a drive control that supplies electric power to the electric motor 10 to a braking control that causes the electric motor 10 to generate electric power.

Figure 6B:
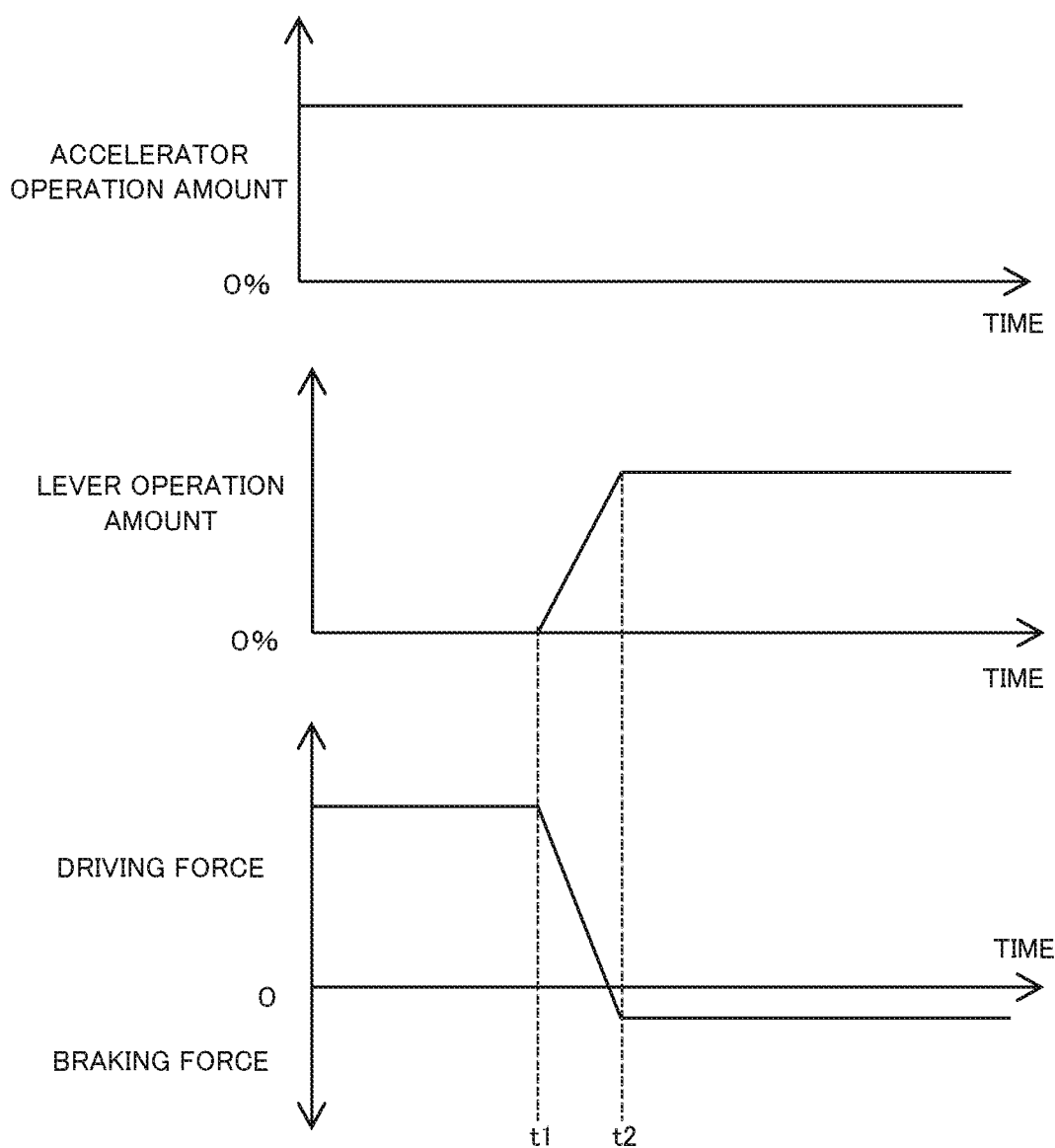
FIG. 6B is a graph illustrating another example of changes in the accelerator operation amount, the lever operation amount, and the driving force over time.

FIG. 6B illustrates another example of changes in an accelerator operation amount, lever operation amount, and a driving force and braking force output by the electric motor 10. As described above, the driving force defined by the plurality of control maps decreases in accordance with an increase in the lever operation amount. Therefore, as illustrated in FIG. 6B, when a driver gradually increases the lever operation amount at t1 while keeping the accelerator operation amount constant, the driving force output by the electric motor 10 gradually decreases. As described above, since the control device 20 performs the complementing process, the driving force continuously decreases in accordance with the increase in the lever operation amount. In addition, the force defined by the control map changes from a driving force (supplied current value) to a braking force (regenerative current value) in accordance with the increase in the lever operation amount, even if the accelerator operation amount is constant. Therefore, as illustrated in FIG. 6B, when the lever operation amount is increased, the control of the control device 20 is switched from the drive control that supplies electric power to the electric motor 10 to the braking control that causes the electric motor 10 to generate electric power.

The control map defines a vehicle speed at which the force (current value) obtained from the control map switches from the driving force (supplied current value) to the braking force (regenerative current value) under a condition that the accelerator operation amount is constant. Hereinafter, the vehicle speed is referred to as the "switching vehicle speed". Referring to the first control map of FIG. 3A, when the accelerator operation amount is, for example, 60%, the force defined by the control map is switched from the driving force to the braking force at a switching vehicle speed Vth 16. In addition, referring to the second control map of FIG. 3B, when the accelerator operation amount is 60%, the force defined by the control map is switched from the driving force to the braking force at a switching vehicle speed Vth 26. Referring to the third control map of FIG. 3C, when the accelerator operation amount is 60%, the force defined by the control map is switched from the driving force to the braking force at a switching vehicle speed Vth 36. The switching vehicle speed is defined for other accelerator operation amounts (for example, 20%, 40%, 80%, 100%, and the like). Therefore, when the speed of the vehicle rises and reaches the switching vehicle speed, the operation state of the vehicle switches from acceleration to deceleration (braking). In the operation state where the accelerator operation amount is low, the regenerative current value (braking force) is defined for the entire region of vehicle speed. In the examples of FIGS. 3A to 3C, the braking force is defined in the entire region of vehicle speed for the accelerator operation amount of 0%.

The switching vehicle speed varies depending on the lever operation amount. Specifically, the switching vehicle speed decreases in accordance with an increase in the lever operation amount. For example, the switching vehicle speed for the accelerator operation amount of 60% has a relationship of Vth 36<Vth 26<Vth 16. Similar to the other accelerator operation amount, the switching vehicle speed defined by the control map decreases in accordance with an increase in the lever operation amount. Therefore, in a state where the driver is operating the operation lever 5B, deceleration (braking) of the vehicle starts at a lower vehicle speed than when the driver does not operate the operation lever 5B.

In the example of the control device 20, in a partial region of the vehicle speed regions, the driving force (supplied current value) defined by the second control map is larger than the driving force defined by the first control map. Specifically, in a region where the vehicle speed is low and where the accelerator operation amount is high, the driving force defined by the second control map is larger than the driving force defined by the first control map. As illustrated by a broken line A1 and a solid line A2 in FIG. 3B, in comparing the first control map and the second control map for the accelerator operation amount of 100%, the driving force defined by the second control map is larger than the driving force defined by the first control map in a region where the vehicle speed is lower than the maximum driving force speed Vmax 2. More specifically, the driving force defined by the second control map is larger than the driving force defined by the first control map in a region where the vehicle speed is lower than a vehicle speed V9. In addition, the maximum driving force defined by the second control map for the accelerator operation amount of 100% is larger than the maximum driving force defined by the first control map. Use of the control maps increase the driving force as the operation of the operation lever 5B becomes larger. Similarly, for a different large accelerator operation amount (for example, 80%), the driving force defined by the second control map is larger than the driving force defined by the first control map in the low vehicle speed region.

Figure 6C:
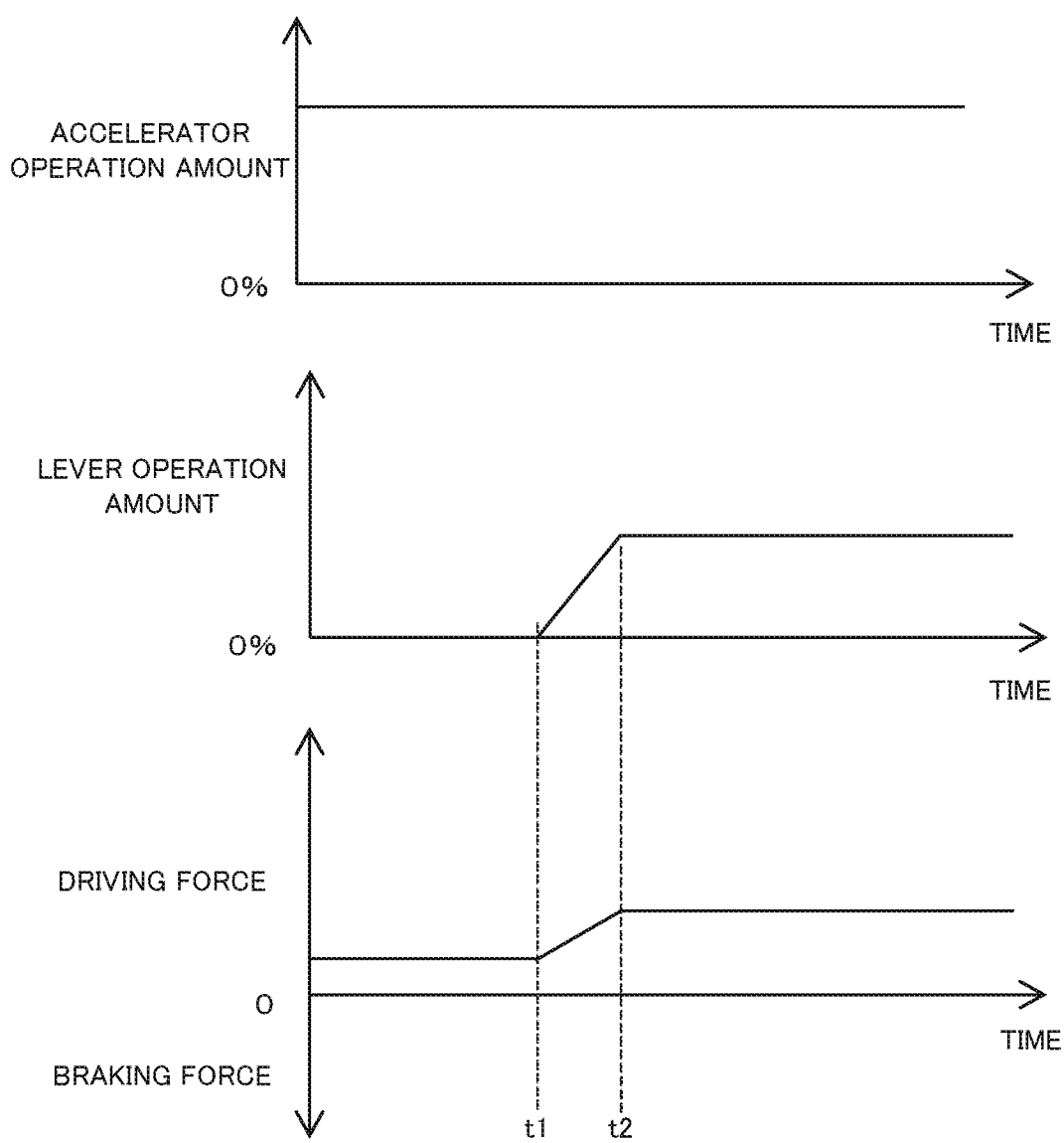
FIG. 6C is a graph illustrating still another example of changes in the accelerator operation amount, the lever operation amount, and the driving force over time.
Figure 7A:
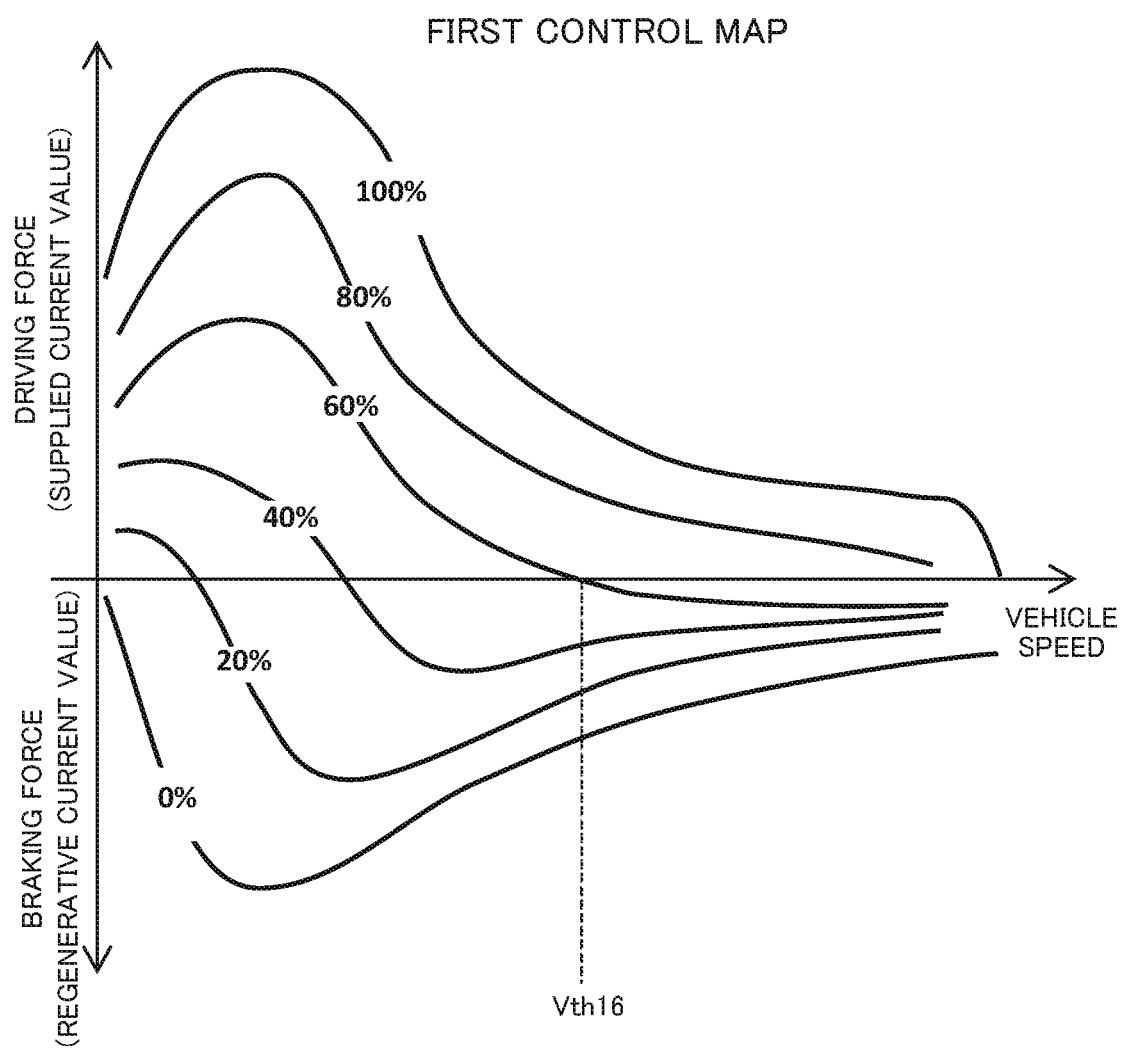
FIG. 7A is a graph illustrating another example of a control map.
Figure 7B:
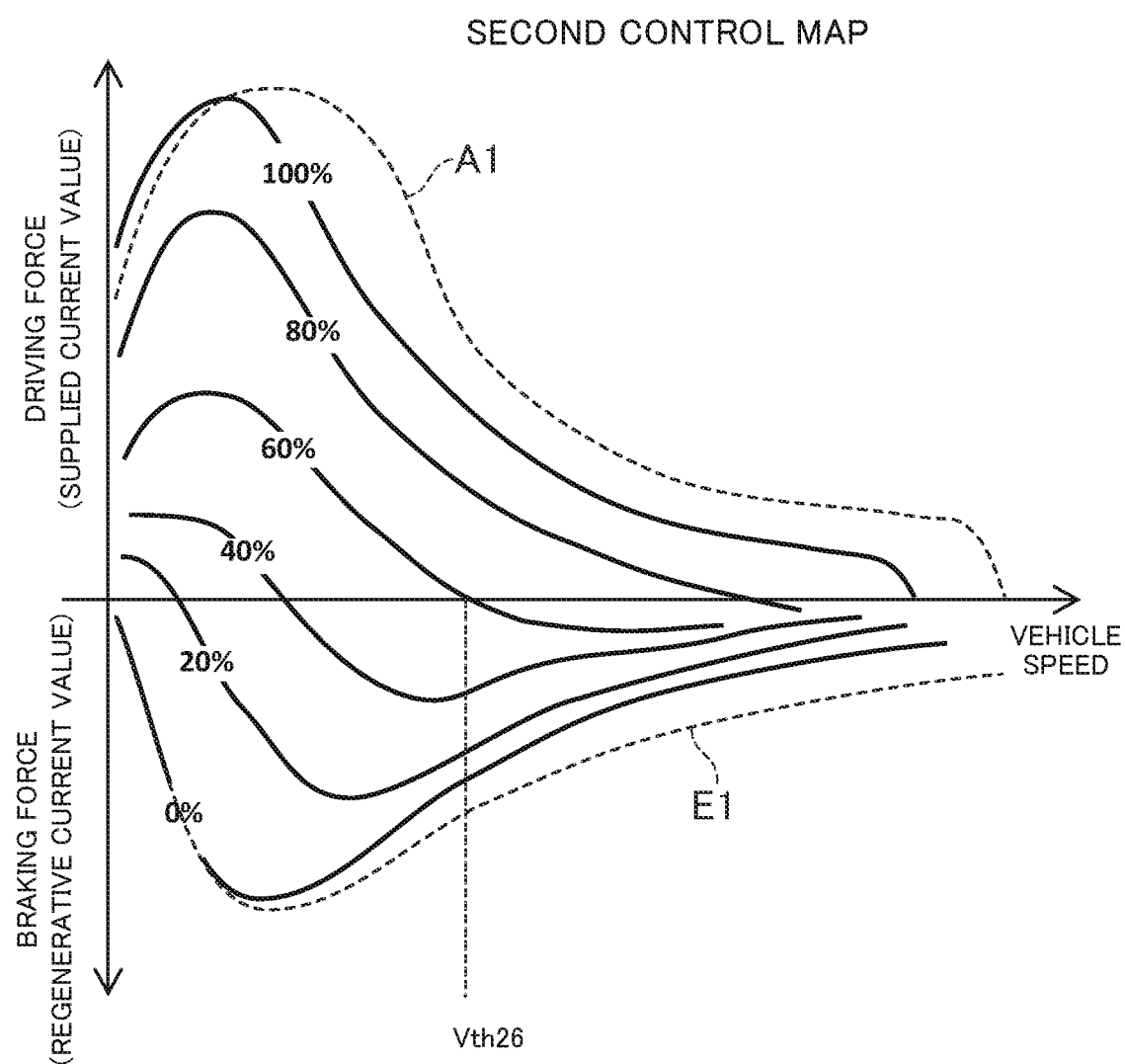
FIG. 7B is a graph illustrating another example of a control map.
Figure 7C:
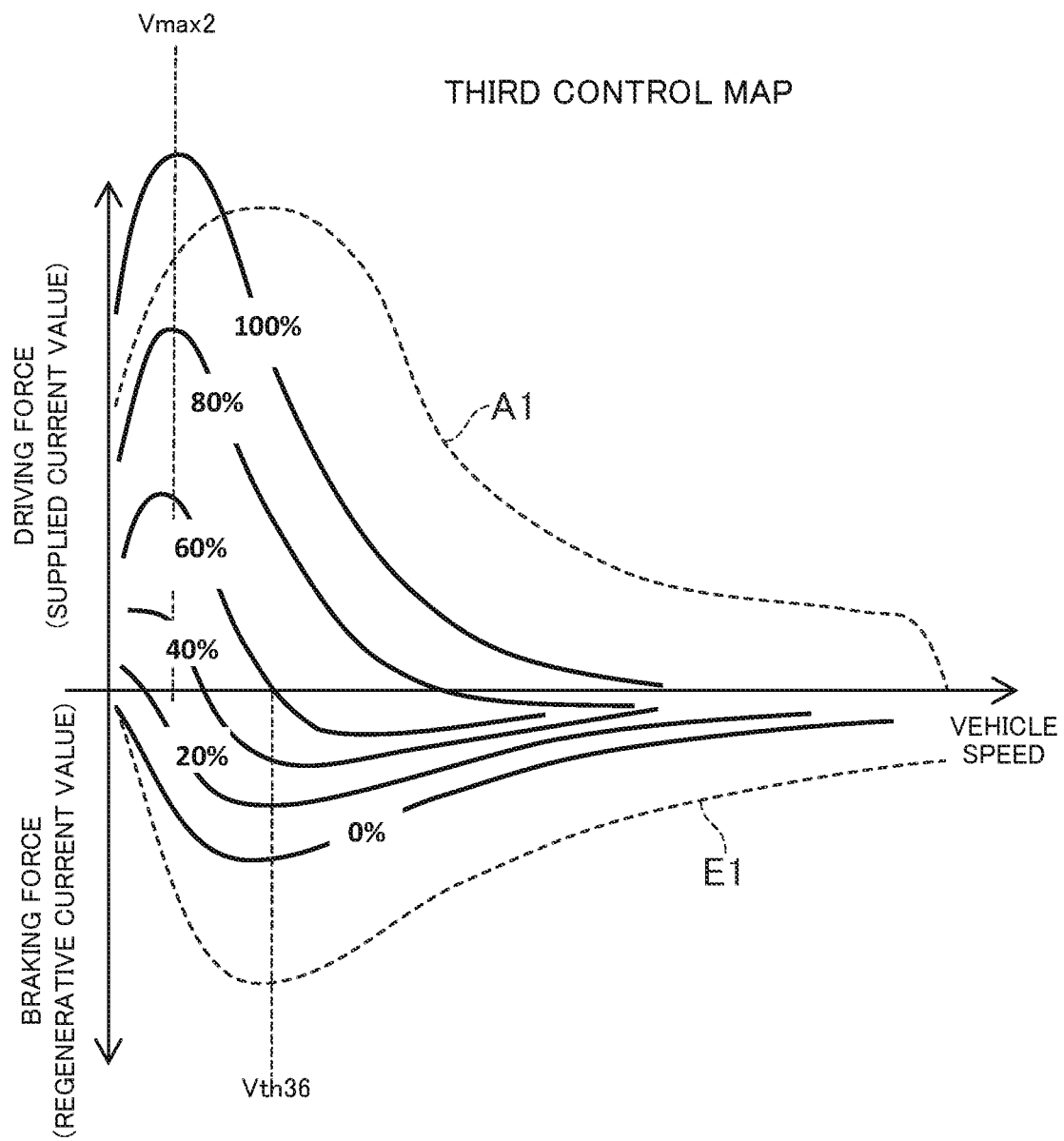
FIG. 7C is a graph illustrating another example of a control map.

FIG. 6C is a graph illustrating still another example of changes in an accelerator operation amount, driving force, and lever operation amount. While the accelerator operation amount is a constant value (for example, 100%), the lever operation amount increases at time t1. According to the control map described above, the driving force increases in accordance with increase in the lever operation amount. This enables the behavior of the electric two-wheeled vehicle 1 to be closer to the engine vehicle. Specifically, when a clutch in an engine vehicle is operated in a state where an accelerator operation amount is high, the engine speed increases and thereby the driving force output from the engine may increase in some cases. The control maps illustrated in FIGS. 3A and 3B increase the driving force of the electric motor 10 due to an operation of the operation lever 5B. This reduces discomfort that a driver accustomed to the engine vehicle feels when the driver operates the operation lever 5B of the electric vehicle 1. In the examples illustrated in FIGS. 3A and 3B, in a state where the accelerator operation amount is low (for example, a state where an accelerator operation amount is 60% or less), the driving force defined by the second control map is the same as the driving force defined in the first control map, or is lower than the driving force defined in the first control map in the entire vehicle speed region.

As described above, the driving force (supplied current value) calculated by the control device 20 decreases in accordance with an increase in the lever operation amount. As illustrated in FIG. 3C, the third control map defines a driving force greater than 0 for the accelerator operation amount of 100% (the accelerator operation amount of 100% is the maximum operation amount of the accelerator grip). That is, in the example of the electric two-wheeled vehicle 1, the driving force output from the electric motor 10 is larger than 0 even in a case where the lever operation amount is at a maximum. In the example of FIG. 3C, the third control map defines a driving force Dp1 for the accelerator operation amount of 100%. The driving force Dp1 larger than 0 has, for example, a magnitude that enables the rear wheel 6, which is a driving wheel, to rotate in a no-load state. This enables a driver to notice that the electric motor 10 is driving when the driver operates the accelerator grip 5A, operating the operation lever 5B. The third control map defines the driving force larger than 0 for the accelerator operation amount (for example, 80% or 60%) lower than 100%.

For the accelerator operation amount of 100%, the driving force defined by the third control map may be 0. In a case where the accelerator operation amount is 100%, the control device 20 may add a predetermined driving force (correction value) to the driving force obtained from the third control map and calculate the additional result as a command value. This process, also, enables the driver to notice that the electric motor 10 is driving when the driver operates the accelerator grip 5A and operates the operation lever 5B.

In addition, as illustrated in FIG. 3C, the third control map defines a braking force greater than 0 for the accelerator operation amount of 100%. Specifically, the third control map defines the braking force greater than 0 for the accelerator operation amount of 100% in the vehicle speed region higher than V8.

The braking force (regenerative current value) defined by the control map decreases in accordance with an increase in the vehicle speed. For example, referring to the second control map of FIG. 3B, a vehicle speed Vmax 4 at which the braking force is at a maximum level, is defined for the accelerator operation amount of 20% (this vehicle speed is referred to as "maximum braking force vehicle speed"). The braking force decreases in accordance with an increase in the vehicle speed in an operating region where the vehicle speed is higher than the maximum braking force vehicle speed Vmax 4. Similarly, a braking force is also defined for other accelerator operation amounts in the operating region higher than the maximum braking force vehicle speed such that the braking force decreases in accordance with an increase in the vehicle speed. This also applies to the third control map of FIG. 3C and the first control map of FIG. 3A.

The braking forces defined by the plurality of maps decrease in accordance with increase in the lever operation amount. That is, in a case where the plurality of control maps are compared at the same operating point (that is, under a condition that accelerator operation amounts in the maps are the same and vehicle speeds in the maps are the same), the braking force defined by the second control map is smaller than the braking force defined by the first control map. Further, in the same comparison, the braking force defined by the third control map is smaller than the braking force defined by the second control map. For example, when the three control maps are compared at the point of "accelerator operation amount of 0% and vehicle speed of V10", the braking force defined by the second control map is smaller than the braking force defined by the first control map, and the braking force defined by the third control map is smaller than the braking force defined by the second control map. Therefore, when the driver gradually increases the lever operation amount while keeping the accelerator operation amount constant, the braking force obtained by the electric power generation of the electric motor 10 gradually decreases. As described above, since the control device 20 performs the complementing process, the braking force continuously decreases in accordance with increase in the lever operation amount.

As illustrated in FIG. 3C, the third control map defines the braking force larger than 0 for the accelerator operation amount of 0% (that is, for a state where the accelerator grip is not operated). That is, in the example of the electric two-wheeled vehicle 1, the braking force obtained by electric power generation of the electric motor 10 is larger than 0 even in a case where the lever operation amount is at a maximum. In the example of FIG. 3C, the third control map defines a braking force Bf1 for the accelerator operation amount of 0%. The braking force Bf1 greater than 0 has, for example, a magnitude capable of decelerating the rear wheel 6 that is rotating in a no-load state. For the accelerator operation amount of 0%, the braking force defined by the third control map may be 0. In a case where the accelerator operation amount is 0%, the control device 20 may add a braking force (correction value) defined in advance to the braking force obtained from the third control map and calculate the additional result as a command value.

[Other Examples of Control Map]

The number of control maps stored in the storage device 20M is not limited to three. For example, the number of control maps stored in the storage device 20M may be four or five or more.

FIGS. 7A to 7D are other examples of the control map stored in the storage device 20M, in which four control maps are illustrated. Hereinafter, the control maps illustrated in FIGS. 7A, 7B, 7C, and 7D will be referred to as a first control map, a second control map, a third control map, and a fourth control map, respectively. The first control map, the second control map, the third control map, and the fourth control map respectively correspond to a first lever operation amount Lv1, a second lever operation amount Lv2, a third lever operation amount Lv3, and a fourth lever operation amount Lv4 (Lv1<Lv2<Lv3<Lv4). The four-lever operation amounts Lv1, Lv2, Lv3, and Lv4 are 0%, 33%, 66%, and 100%, respectively, for example. In addition, in FIGS. 7B to 7D, a broken line A1 is the driving force defined in the first control map for the accelerator operation amount of 100%, a broken line E1 is the braking force defined in the first control map for the accelerator operation amount of 0%. The driving force and the braking force defined by the four control maps illustrated in FIGS. 7A to 7D are approximately similar to the driving force and the braking force defined by the three control maps illustrated in FIGS. 3A to 3C.

That is, in each control map, under a condition that the accelerator operation amount is constant, the driving force (in other words, supplied current value) of the electric motor 10 increases in accordance with an increase in the vehicle speed in the operating region where the vehicle speed is from 0 km/h to the maximum driving force speed. In the operating region where the vehicle speed is higher than the maximum driving force speed, the driving force decreases in accordance with an increase in the vehicle speed.

In addition, the driving force defined by the plurality of control maps decreases in accordance with an increase in the lever operation amount. That is, in a case where the plurality of control maps are compared at the same operating point, the driving force (supplied current value) defined by the second control map is smaller than the driving force defined by the first control map. In addition, the driving force defined by the third control map is smaller than the driving force defined by the second control map. Furthermore, the driving force defined by the fourth control map is smaller than the driving force defined by the third control map.

In addition, the driving force (supplied current value) defined by the second control map decreases in accordance with an increase in the vehicle speed more rapidly than the driving force defined by the first control map. That is, in comparing the two control maps for the same accelerator operation amount, a rate of decrease in the driving force defined by the second control map due to the increase in the vehicle speed is larger than that of the driving force defined by the first control map. In addition, when the vehicle speed increases, the driving force (supplied current value) defined by the third control map decreases more rapidly than the driving force defined by the second control map.

In addition, each control map defines, for the plurality of accelerator operation amounts, the vehicle speed (that is, "switching vehicle speed") at which the force (current value) obtained from the control map is switched from the driving force (supplied current value) to the braking force (regenerative current value). The switching vehicle speed decreases in accordance with an increase in the lever operation amount. For example, the switching vehicle speed for the accelerator operation amount of 60% has a relationship of Vth 46<Vth 36<Vth 26<Vth 16 (Vth 16, Vth 26, Vth 36, and Vth 46 are switching vehicle speeds defined by the first, second, third, and fourth control maps, respectively).

In addition, similar to the second control map illustrated in FIG. 3B, when comparing the first control map and the third control map (refer to broken line A1 and solid line A3 in FIG. 7C) for the accelerator operation amount of 100%, the driving force defined by the third control map is larger than the driving force defined by the first control map in a region of low vehicle speed (for example, vehicle speed region lower than the maximum driving force speed Vmax 2). Similarly, for a different large accelerator operation amount (for example, 80%), the driving force defined by the third control map is larger than the driving force defined by the first control map in the low vehicle speed region.

In addition, as illustrated in FIG. 7D, the fourth control map defines the driving force larger than 0 for the accelerator operation amount of 100%. That is, the driving force output from the electric motor 10 is larger than 0 even in a case where the lever operation amount is at a maximum. This enables a driver to notice that the electric motor 10 is driving when the driver operates the accelerator grip 5A, operating the operation lever 5B.

The braking force (regenerative current value) defined by each control map decreases in accordance with an increase in the vehicle. For example, referring to the second control map of FIG. 7B, the braking force for the accelerator operation amount of 20% decreases in accordance with an increase in the vehicle speed in an operating region where the vehicle speed is higher than the maximum braking force vehicle speed. In addition, similarly in the third control map illustrated in FIG. 7C and the fourth control map illustrated in FIG. 7D, the braking force decreases in accordance with an increase in the vehicle speed in the operating region where the vehicle speed is higher than the maximum braking force vehicle speed.

Furthermore, when the plurality of control maps are compared at the same driving point, the braking force defined by the second control map is smaller than the braking force defined by the first control map. In the same comparison, the braking force defined by the third control map is smaller than the braking force defined by the second control map. Furthermore, the braking force defined by the fourth control map is smaller than the braking force defined by the third control map. Those maps gradually decrease the braking force obtained by the electric power generation of the electric motor 10 when the driver gradually increases the lever operation amount while keeping the accelerator operation amount constant. As described above, the complementing process performed by the control device 20 allows the braking force to continuously decrease in accordance with an increase in the lever operation amount.

As described above, in the electric two-wheeled vehicle 1, the storage device 20M stores the plurality of control maps respectively corresponding to the plurality of lever operation amounts. Each control map defines a driving force to be output from the electric motor 10 such that the driving force corresponds to an accelerator operation amount and a vehicle speed. The control device 20 refers to a control map, among the plurality of control maps, that corresponds to a lever operation amount detected through the lever position sensor 28. By referring to the control map, the control device 20 calculates a driving force to be output from the electric motor 10 based on the actual accelerator operation amount and the actual vehicle speed. This enables the behavior of the vehicle 1, due to an operation of the operation lever 5B, to be closer to the behavior of an engine vehicle due to operation of its clutch lever. This also alleviates the discomfort that a driver, accustomed to the engine vehicle, feels in operating the operation lever 5B of the electric vehicle 1.

The present invention is not limited to the above-described embodiment, and various modifications are possible.

For example, each control map may define a driving force (torque) to be output from the electric motor 10, not the supplied current values, such that the driving force corresponds to an accelerator operation amount and a vehicle speed. In this case, the control device 20 may convert the driving force obtained from the control map into a current value and output the command value corresponding to the current value to the motor driving device 24. In addition, each control map may define a braking force (for example, negative torque) to be obtained by electric power generation of the electric motor 10, not the regenerative current value, such that the braking force corresponds to an accelerator operation amount and a vehicle speed. In this case, the control device 20 may convert the braking force obtained from the control map into a current value and output the command value to the motor driving device 24 as the command value corresponding to the current value.

In addition, the number of control maps stored in the storage device 20M may be two. For example, the storage device 20M may store a control map provided, corresponding to the lever operation amount of 0% and a control map provided, corresponding to the lever operation amount of 100%. In a case where the actual lever operation amount is between 0% and 100%, the control device 20 may calculate the command value based on the two driving forces (supplied current values) or the two braking forces (regenerative current value) obtained from the two control maps. For example, the control device 20 may proportionally divide the difference between the two driving forces and calculate the command value based on the result of the proportional division.

[Example of Periodically Varying Driving Force]

Figure 8:
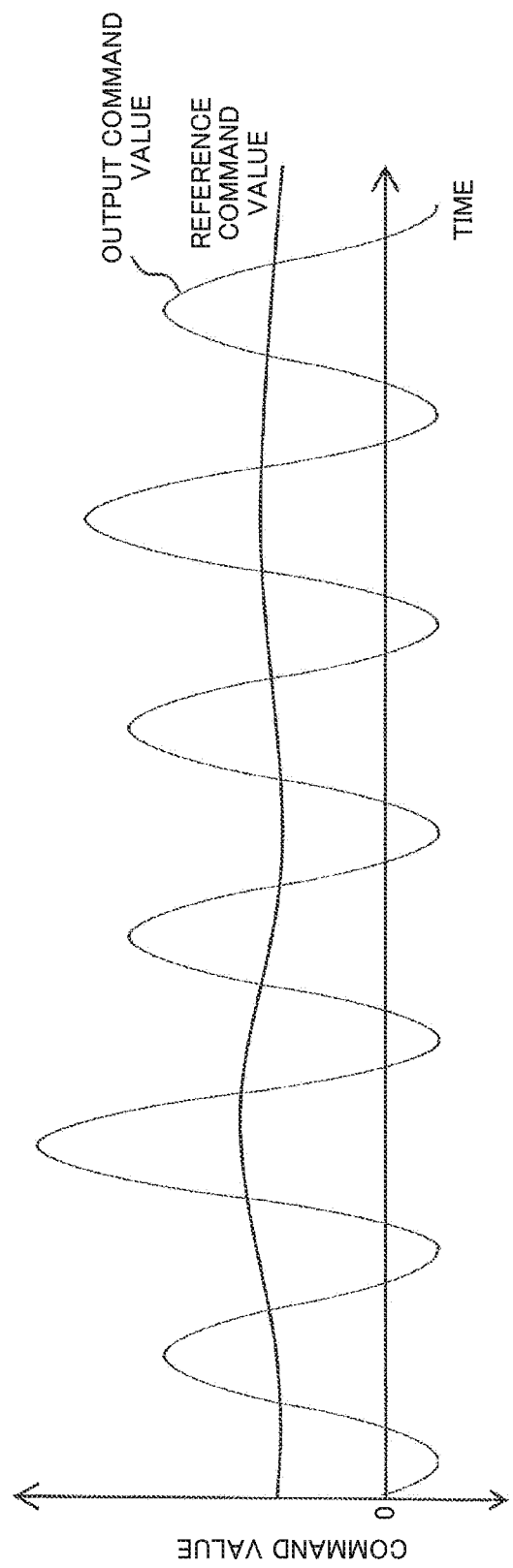
FIG. 8 is a graph for describing a modification example which shows a command value varying periodically.

In an engine vehicle, the rotational speed of the crank varies periodically in accordance with an operation stroke (intake stroke, compression stroke, combustion stroke, and exhaust stroke) of the engine. Similarly, in the electric two-wheeled vehicle 1, the driving force output by the electric motor 10 may be periodically varied. In other words, the control device 20 may periodically vary the command value that is output to the motor driving device 24, that is, the command value for the electric power to be supplied from the motor driving device 24 to the electric motor 10. As illustrated in FIG. 8, for example, the command value may vary periodically ("output command value" in FIG. 8 is a command value to be output to the motor driving device 24, and varies periodically). When the rear wheel 6 slips against the ground, the process described here eliminates the slip and recovers the grip on the ground of the rear wheel 6 when the rotational speed of the electric motor 10 is lowered. Such a command value can be calculated by the following method.

The command value calculation unit 22 refers to the control map. In the example of the motorcycle 1, the command value calculation unit 22 refers to the control map selected by the map selection unit 21. The command value calculation unit 22 calculates a command value (herein, referred to as "reference command value" (refer to FIG. 8)) corresponding to the actual accelerator operation amount and the actual vehicle speed from the control map. The command value calculation unit 22 calculates a command value that periodically varies using the reference command value and outputs the varying command value to the motor driving device 24 (varying command value, that is, command value to be output to the motor driving device 24 is hereinafter referred to as "output command value").

The output command value may be calculated, for example, by the following formula (1) using the reference command value.

$$\text{Output command value} = A \times \sin(t \times 2\pi/K) + \text{reference command value} \qquad \text{Formula (1)}$$

A is an amplitude, t is time, and K is a period. The period K may have a fixed value or may be set according to the rotational speed of the electric motor 10 and the vehicle speed. For example, the period K may be shortened in accordance with an increase in the rotational speed of the electric motor 10 or an increase in the vehicle speed.

As illustrated in FIG. 8, even in a case where the reference command value is a positive value, that is, even in a case where the reference command value indicates the current value (supplied current value (refer to FIG. 3A)) to be supplied from the motor driving device 24 to the electric motor 10, the output command value may be periodically negative. That is, the output command value may indicate a current value (that is, regenerative current value) obtained by electric power generation of the electric motor 10. The process described above allows a braking force to periodically act on the rear wheel 6, thereby improving the grip of the rear wheel 6 to the ground, and alleviating a rapid increase in the rotational speed of the rear wheel 6 due to slip. In the case where the above-described formula (1) is used, for example, the amplitude A is set so that "amplitude A>reference command value". For example, the amplitude A can be calculated from the reference command value using a predetermined arithmetic expression (for example, A=reference command value×coefficient (coefficient>1)). This calculation periodically obtains the output command value of a negative value. The amplitude A may be a fixed value so as to have a relationship "amplitude A>reference command value". The output command value of a negative value may be calculated only in a case where the reference command value satisfies a predetermined condition, for example, only in a case where the reference command value is higher than a threshold.

As described above, in the example of the electric two-wheeled vehicle 1, the plurality of control maps are recorded in the storage device 20M. When the control map is switched by operating the operation lever 5B, for example, when the control map is switched from the first control map (FIG. 3A) to the second control map (FIG. 3B) or the third control map (FIG. 3C), the reference command value decreases and thus the output command value may not be required to have the above-described negative value for the grip (that is, when the second control map (FIG. 3B) or the third control map (FIG. 3C) are used, output command value may normally have a positive value). When the amplitude A is set so that "amplitude A<reference command value", the output command value normally has a positive value. Unlike this case, even in a case where the control map is switched by operating the operation lever 5B, the amplitude A may be set so that "amplitude A>reference command value".

The output command value may be calculated also by the following process, for example. One or both of the upper limit value and the lower limit value of the output command value may be calculated based on the reference command value. The command value calculation unit 22 may periodically switch the output command value between the upper limit value and the lower limit value. The upper limit value and the lower limit value can be calculated from, for example, the following formulas (2) and (3).

$$\text{Upper limit value} = \text{reference command value} + \alpha 1 \qquad \text{Formula (2)}$$

$$\text{Lower limit value} = \text{reference command value} - \alpha 2 \qquad \text{Formula (3)}$$

This enables the process for varying the output command value to be simplified. Alternatively, the reference command value may be used as the upper limit value and the lower limit value may have "reference command value−α2".

Also, in this method, the output command value may have a negative value periodically. That is, the output command value may indicate the regenerative current value. The regenerative current value allows a braking force to periodically act on the rear wheel 6, thereby improving the grip on the ground of the rear wheel 6, and alleviating a rapid increase in the rotational speed of the rear wheel 6 due to the slip of the rear wheel 6.

For example, α2 may be set so as to be "α2>reference command value". For example, a constant α2 is set so as to be "constant α2>reference command value". Such a constant α2 may be calculated from the reference command value using a predetermined arithmetic expression (for example, constant α2=reference command value×coefficient (coefficient>1)). The process described here periodically obtains the output command value of a negative value. The constant α2 may be a fixed value so as to have a relationship "constant α2>reference command value". The output command value of a negative value may be calculated only in a case where the reference command value satisfies a predetermined condition, for example, only in a case where the reference command value is higher than a threshold.

When the control map is switched by operating the operation lever 5B, for example, when the control map is switched from the first control map (FIG. 3A) to the second control map (FIG. 3B) or the third control map (FIG. 3C), the reference command value decreases, and thus the output command value may not be required to have the above-described negative value for the grip (that is, when the second control map (FIG. 3B) or the third control map (FIG. 3C) are used, output command value may normally have a positive value). When the constant α2 is set so that "constant α2<reference command value", the output command value normally has a positive value. Unlike this case, even in a case where the control map is switched by operating the operation lever 5B, the constant α2 may be set so that "constant α2>reference command value".

The above-described process of periodically varying the output command value, or the above-described process of periodically setting the output command value to a negative value may be performed in an electric two-wheeled vehicle having only one control map, that is, the electric two-wheeled vehicle not having the function of switching the control map corresponding to the operation of the operation lever 5.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An electric vehicle comprising:
   an electric motor that drives the vehicle;
   a first operation member that is configured to receive an operation from a driver;
   a second operation member that is configured to receive an operation from the driver;
   a storage device having a plurality of maps stored therein that respectively correspond to a plurality of operation values of the second operation member, where each map includes information about a plurality of accelerator operation values, where the accelerator operation value is an operation value of the first operation member, and where information about each accelerator operation value defines driving forces to be output from the electric motor such that a particular driving force corresponds to a vehicle speed and an accelerator operation value; and a processor that refers to a map, among the plurality of maps, that corresponds to an operation value of the second operation member detected through a sensor and thereby calculates a driving force to be output from the electric motor based on a vehicle speed and an accelerator operation value detected through sensors, wherein the plurality of operation values of the second operation member vary between 0% and 100%;

wherein at least one of the plurality of maps defines a driving force for a partial region of an operating region of the electric motor such that the driving force corresponds to the accelerator operation value and the vehicle speed and defines a braking force for another partial region of the operating region of the electric motor such that the braking force corresponds to the accelerator operation value and the vehicle speed; and wherein a braking force is defined in the at least one of the plurality of maps for at least one non-zero accelerator operation value.

2. The electric vehicle according to claim 1, wherein
the plurality of maps include a first map corresponding to a first operation value of the second operation member and a second map corresponding to a second operation value of the second operation member,
the second operation value is larger than the first operation value, and
a driving force defined by the second map is smaller than a driving force defined by the first map in a partial region of vehicle speed when the first map and the second map are compared at the same accelerator operation value.

3. The electric vehicle according to claim 1, wherein
the plurality of maps include a first map corresponding to a first operation value of the second operation member and a second map corresponding to a second operation value of the second operation member,
the second operation value is larger than the first operation value, and
a driving force defined by the second map is larger than a driving force defined by the first map in a partial region of vehicle speed when the first map and the second map are compared at the same accelerator operation value.

4. The electric vehicle according to claim 1, wherein
the plurality of maps include a first map corresponding to a first operation value of the second operation member and a second map corresponding to a second operation value of the second operation member,
the second operation value is larger than the first operation value, and
a rate of decrease in a driving force due to an increase in the vehicle speed in the second map is larger than a rate of decrease in a driving force due to an increase in the vehicle speed in the first map.

5. The electric vehicle according to claim 1, wherein
the processor calculates the driving force larger than 0 when the operation value of the second operation member is at a maximum.

6. The electric vehicle according to claim 5, wherein
the plurality of maps include a map corresponding to the maximum operation value of the second operation member, and
the map corresponding to the maximum operation value of the second operation member defines a driving force larger than 0.

7. The electric vehicle according to claim 1, wherein
the processor selects and refers to the map corresponding to the operation value of the second operation member detected through the sensor among the plurality of maps.

8. The electric vehicle according to claim 1, wherein at least three maps are stored as the plurality of maps in the storage device.

9. The electric vehicle according to claim 1, wherein
at least one map defines a braking force to be obtained by electric power generation of the electric motor such that the braking force corresponds to the accelerator operation value and the vehicle speed, and
the processor uses a map, among the plurality of maps and the at least one map, corresponding to the operation value of the second operation member detected through the sensor, and calculates the driving force or a braking force based on the vehicle speed and the accelerator operation value detected through the sensors.

10. The electric vehicle according to claim 9, wherein
force defined by the at least one map changes from the driving force to the braking force at a predetermined vehicle speed.

11. The electric vehicle according to claim 9, wherein
the braking force calculated by the processor decreases in accordance with an increase in the operation value of the second operation member, and
the processor calculates the braking force larger than 0 when the operation value of the second operation member is at a maximum.

12. The electric vehicle according to claim 11, wherein
the at least one map corresponds to the maximum operation value of the second operation member, and the at least one map defines a braking force larger than 0.

13. The electric vehicle according to claim 9, wherein
the force defined by the plurality of maps and the at least one map changes from the driving force to the braking force at a predetermined vehicle speed, and
the predetermined vehicle speed decreases in accordance with an increase in the operation value of the second operation member.

14. The electric vehicle according to claim 9, wherein
the processor calculates the braking force larger than 0 when the accelerator operation value is at a maximum and the operation value of the second operation member is at a maximum.

15. The electric vehicle according to claim 1, wherein the second operation member is a lever.

16. The electric vehicle according to claim 1, wherein the second operation member is a rotatable grip or a foot lever.

17. The electric vehicle according to claim 1, wherein each map includes information about the plurality of accelerator operation values from a lowest accelerator operation value to a highest accelerator operation value.

18. The electric vehicle according to claim 1, wherein the first operation member is an accelerator grip, an accelerator lever, or a thumb accelerator member which is configured to be pushed by a thumb.

19. The electric vehicle according to claim 1, further comprising a handle; wherein the first operation member is attached to the handle.

20. An electric vehicle comprising:
an electric motor that drives the vehicle;
a first operation member that is configured to receive an operation from a driver;
a second operation member that is configured to receive an operation from the driver;
a storage device having a plurality of maps stored therein that respectively correspond to a plurality of operation values of the second operation member, where each map includes information about a plurality of accelerator operation values, where the accelerator operation value is an operation value of the first operation member, and where information about each accelerator operation value defines driving forces to be output from the electric motor such that a particular driving force corresponds to a vehicle speed and an accelerator operation value; and
a processor that refers to a map, among the plurality of maps, that corresponds to an operation value of the second operation member detected through a sensor and thereby calculates a driving force to be output from the electric motor based on a vehicle speed and an accelerator operation value detected through sensors,
wherein the plurality of operation values of the second operation member vary between 0% and 100%;
wherein the plurality of maps include a first map corresponding to a first operation value of the second operation member, a second map corresponding to a second operation value of the second operation member, and a third map corresponding to a third operation value of the second operation member,
the second operation value is larger than the first operation value,
the third operation value is larger than the second operation value, and
the processor calculates the driving force by performing a complementing process between a driving force calculated from the first map based on the operation value of the first operation member and a driving force calculated from the second map based on the operation value of the first operation member when the operation value of the second operation member is between the first operation value and the second operation value.

21. The electric vehicle according to claim 20, wherein
a first current value which is either a supplied current value or a regenerative current value is calculated from the first map; and
a second current value which is either a supplied current value or a regenerative current value is calculated from the second map is calculated; and
wherein a supplied current value indicates that the electric vehicle is not regeneratively braking, and a regenerative current value indicates the electric vehicle is regeneratively braking.

22. The electric vehicle according to claim 21, wherein the processor performs the complementing process by proportionally dividing the difference between the first current value and the second current value based on the value of the second operation member.

23. The electric vehicle according to claim 21, wherein the first current value is a regenerative current and the second current value is a supplied current value.

* * * * *